(12) United States Patent
Naidu et al.

(10) Patent No.: US 12,490,324 B2
(45) Date of Patent: Dec. 2, 2025

(54) QUICK ACCESS POINT START WITH OUT OF BAND CHANNEL SCAN OFFLOAD

(71) Applicant: QUALCOMM Incorporated, San Diego, CA (US)

(72) Inventors: Vamsi Krishna Naidu, Hyderabad (IN); Purushottam Lnu, Hyderabad (IN); Madhvapathi Sriram, Kalyan Nagar (IN)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 17/484,373

(22) Filed: Sep. 24, 2021

(65) Prior Publication Data
US 2023/0107752 A1  Apr. 6, 2023

(51) Int. Cl.
H04B 7/00     (2006.01)
H04W 76/14    (2018.01)
H04W 76/15    (2018.01)

(52) U.S. Cl.
CPC .......... *H04W 76/15* (2018.02); *H04W 76/14* (2018.02)

(58) Field of Classification Search
CPC ..... H04W 76/15; H04W 76/14; H04W 8/005; H04W 84/18; H04W 76/16; H04W 84/12; H04W 88/06
See application file for complete search history.

(56) References Cited

U.S. PATENT DOCUMENTS

| | | | |
|---|---|---|---|
| 2004/0189811 A1* | 9/2004 | Ishiyama | H04N 1/00347 348/207.2 |
| 2006/0205407 A1* | 9/2006 | Jagadeesan | H04W 36/144 455/436 |
| 2013/0308685 A1* | 11/2013 | Nagai | H04B 1/715 375/133 |
| 2015/0358905 A1* | 12/2015 | Ding | H04W 52/0219 370/311 |
| 2016/0353382 A1 | 12/2016 | Xue | |

(Continued)

OTHER PUBLICATIONS

International Search Report and Written Opinion—PCT/US2022/039835—ISA/EPO—May 25, 2023.
Taiwan Search Report—TW111130039—TIPO—Sep. 16, 2025.

*Primary Examiner* — Sithu Ko
*Assistant Examiner* — Hidayat Dabiri
(74) *Attorney, Agent, or Firm* — Holland & Hart LLP

(57) ABSTRACT

This disclosure provides systems, methods, and apparatus, including computer programs encoded on computer storage media, for establishing wireless connections between a first wireless communication device and a second wireless communication device. In some implementations, the first wireless communication device may establish a first connection with a second wireless communication device in accordance with a first communication protocol, perform a first channel scan of a first set of wireless channels responsive to establishing the first connection, the first channel scan being associated with a second wireless communication protocol, establish a second connection directly with the second wireless communication device in accordance with the second wireless communication protocol based on the first channel scan, and receive one or more data streams directly from the second wireless communication device in accordance with the second wireless communication protocol.

24 Claims, 16 Drawing Sheets

(56) References Cited

U.S. PATENT DOCUMENTS

| | | |
|---|---|---|
| 2017/0064760 A1* | 3/2017 | Kandagadla ........ H04L 63/0428 |
| 2017/0223579 A1* | 8/2017 | Lee ..................... H04W 36/035 |
| 2020/0106877 A1* | 4/2020 | Ledvina .................... H04L 9/30 |
| 2021/0195590 A1* | 6/2021 | Aoyama ................ H04W 72/02 |
| 2021/0266808 A1* | 8/2021 | Avadhanam ........ H04W 36/304 |
| 2021/0306832 A1* | 9/2021 | Juntunen ................. H04W 4/80 |

* cited by examiner

US 12,490,324 B2

QUICK ACCESS POINT START WITH OUT OF BAND CHANNEL SCAN OFFLOAD

TECHNICAL FIELD

This disclosure relates generally to wireless communication, and more specifically, to establishment of wireless connections for streaming data to peripheral devices.

DESCRIPTION OF THE RELATED TECHNOLOGY

A wireless local area network (WLAN) may be formed by one or more wireless access points (APs) that provide a shared wireless communication medium for use by a number of client devices or stations (STAs). Each AP, which may correspond to a Basic Service Set (BSS), may periodically broadcast beacon frames to enable any STAs within wireless range of the AP to establish and maintain a communication link with the WLAN. WLANs that operate in accordance with the IEEE 802.11 family of standards are commonly referred to as Wi-Fi networks.

Some wireless communication devices may receive data streams using wireless communication protocols such as Wi-Fi protocols, LTE wireless protocols, and similar. Examples of such devices may be associated with various applications which include, but are not limited to, real-time gaming applications, video communications, and augmented reality (AR) and virtual reality (VR) applications (collectively referred to as extended reality (XR) applications). It is desirable to configure such devices to be able to receive such data streams quickly, for improved performance and for ease of consumer use.

SUMMARY

The systems, methods, and devices of this disclosure each have several innovative aspects, no single one of which is solely responsible for the desirable attributes disclosed herein.

One innovative aspect of the subject matter described in this disclosure can be implemented as a method of wireless communication. The method can be performed by a first wireless communication device, and can include establishing a first connection with a second wireless device in accordance with a first communication protocol, performing a first channel scan of a first set of wireless channels responsive to establishing the first connection, where the first channel scan is associated with a second wireless communication protocol, establishing a second connection directly with the second wireless device in accordance with the second wireless communication protocol based on the first channel scan, and receiving one or more data streams directly from the second wireless communication device in accordance with the second wireless communication protocol.

In some aspects, the first communication protocol is a relatively shorter range wireless protocol than the second wireless communication protocol. In some aspects the first communication protocol is a Bluetooth protocol, a Bluetooth Low Energy (BLE) protocol, or a near field communications (NFC) protocol.

In some implementations, the method further includes transmitting a result of the first channel scan to the second wireless communication device in accordance with the first communication protocol.

In some implementations, establishing the second connection is further based on a second channel scan performed by the second wireless communication device, where the second channel scan is associated with a second set of wireless channels. In some aspects, the first set of wireless channels is the same as the second set of wireless channels. In some other aspects, no channels in the first set of wireless channels are in the second set of wireless channels.

In some implementations, the second wireless communication protocol is a wireless communication protocol in accordance with the Institute of Electrical and Electronics Engineers (IEEE) 802.11 family of standards.

Another innovative aspect of the subject matter described in this disclosure can be implemented in a first wireless communication device. The first wireless communication device can include at least one processor and at least one memory communicatively coupled to the at least one processor and storing processor-readable code for execution by the at least one processor. Execution of the processor-readable code configures the first wireless communication device to establish a first connection with a second wireless device in accordance with a first communication protocol, perform a first channel scan of a first set of wireless channels responsive to establishing the first connection, where the first channel scan is associated with a second wireless communication protocol, establish a second connection directly with the second wireless device in accordance with the second wireless communication protocol based on the first channel scan, and receive one or more data streams directly from the second wireless device in accordance with the second wireless communication protocol.

In some aspects, the first communication protocol is a relatively shorter range wireless protocol than the second wireless communication protocol. In some aspects the first communication protocol is a Bluetooth protocol, a Bluetooth Low Energy (BLE) protocol, or a near field communications (NFC) protocol.

In some implementations, execution of the instructions causes the first wireless communication device to transmit a result of the first channel scan to the second wireless communication device in accordance with the first communication protocol.

In some implementations, establishing the second connection is further based on a second channel scan performed by the second wireless communication device, where the second channel scan is associated with a second set of wireless channels. In some aspects, the first set of wireless channels is the same as the second set of wireless channels. In some other aspects, no channels in the first set of wireless channels are in the second set of wireless channels.

In some implementations, the second wireless communication protocol is a wireless communication protocol in accordance with the Institute of Electrical and Electronics Engineers (IEEE) 802.11 family of standards.

Another innovative aspect of the subject matter described in this disclosure can be implemented as a method of wireless communication. The method can be performed by a first wireless communication device and can include establishing a first connection with a second wireless communication device in accordance with a first communication protocol, receiving, from the second wireless communication device and in accordance with the first communication protocol, results of a first channel scan of a first set of wireless channels, where the first channels scan is associated with a second wireless communication protocol, configuring the first wireless communication device to operate as an access point associated with the second wireless communication protocol, establishing a second connection directly with the second wireless communication device in accordance with the second wireless communication protocol based on the results of the first channel scan, and transmitting one or more data streams directly to the second wireless communication device in accordance with the second wireless communication protocol.

In some aspects, the first communication protocol is a relatively shorter range wireless protocol than the second wireless communication protocol. In some aspects the first communication protocol is a Bluetooth protocol, a Bluetooth Low Energy (BLE) protocol, or a near field communications (NFC) protocol.

In some aspects the method further includes performing a second channel scan of a second set of wireless channels, where establishing the second connection is further based on the second channel scan. In some aspects, the first set of wireless channels is the same as the second set of wireless channels. In some other aspects, no channels in the first set of wireless channels are in the second set of wireless channels.

In some implementations, the second wireless communication protocol is a wireless communication protocol in accordance with the Institute of Electrical and Electronics Engineers (IEEE) 802.11 family of standards.

Another innovative aspect of the subject matter described in this disclosure can be implemented in a first wireless communication device. The first wireless communication device can include at least one processor and at least one memory communicatively coupled to the at least one processor and storing processor-readable code for execution by the at least one processor. Execution of the processor-readable code configures the first wireless communication device to establish a first connection with a second wireless communication device in accordance with a first communication protocol, receive, from the second wireless communication device and in accordance with the first communication protocol, results of a first channel scan of a first set of wireless channels, where the first channels scan is associated with a second wireless communication protocol, configure the first wireless communication device to operate as an access point associated with the second wireless communication protocol, establish a second connection directly with the second wireless communication device in accordance with the second wireless communication protocol based on the results of the first channel scan, and transmit one or more data streams directly to the second wireless communication device in accordance with the second wireless communication protocol.

In some aspects, the first communication protocol is a relatively shorter range wireless protocol than the second wireless communication protocol. In some aspects the first communication protocol is a Bluetooth protocol, a Bluetooth Low Energy (BLE) protocol, or a near field communications (NFC) protocol.

In some aspects the execution of the instructions causes the first wireless communication device to perform a second channel scan of a second set of wireless channels, where establishing the second connection is further based on the second channel scan. In some aspects, the first set of wireless channels is the same as the second set of wireless channels. In some other aspects, no channels in the first set of wireless channels are in the second set of wireless channels.

In some implementations, the second wireless communication protocol is a wireless communication protocol in accordance with the Institute of Electrical and Electronics Engineers (IEEE) 802.11 family of standards.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
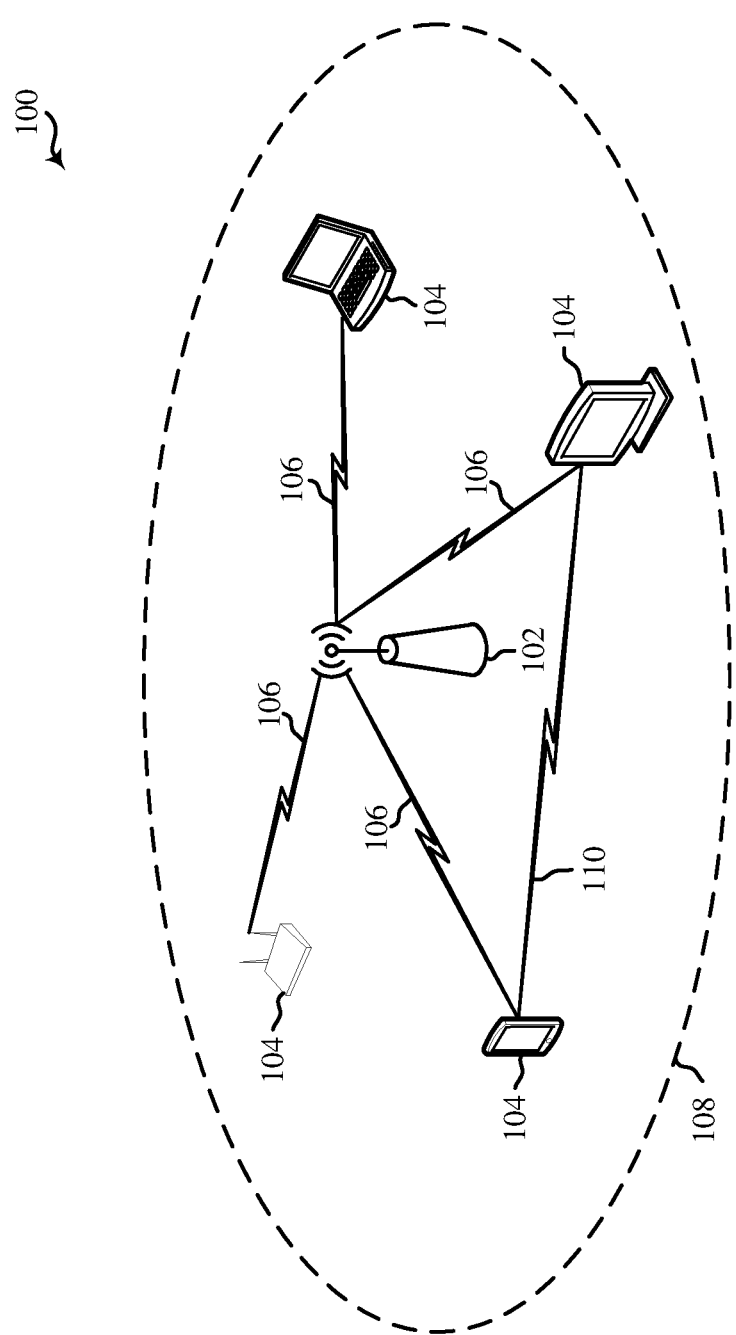
FIG. 1 shows a pictorial diagram of an example wireless communication network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (IoT) network.

The use of peripheral wireless communication devices is increasingly common. Peripheral wireless communication devices ("peripheral devices") may refer to any wireless devices configured to receive one or more data streams directly from a source wireless communication device (a "source device"). One example type of peripheral wireless communication device may be a headset (HMD) configured for augmented reality (AR), virtual reality (VR), or other extended reality (XR) applications which may receive one or more data streams directly from a source wireless communication device such as a mobile phone, a tablet, a laptop, a desktop computer, or another suitable wireless communication device. Such data streams may communicate audio, video, and other data directly to a peripheral wireless communication device. Other peripheral wireless communication devices may include wireless speakers, headphones, headsets, and video display devices, among other examples.

A source device may be configured to transmit the one or more data streams directly to a peripheral device using multiple communication protocols. For example, the source device and the peripheral device may initially communicate according a first communication protocol. The first communication protocol may be a short range wireless protocol (such as a Bluetooth, a Bluetooth Low Energy (BLE), or a Near Field Communications (NFC) wireless communication protocol) or a wired communication protocol (such as an Ethernet protocol). After a first connection between the source device and the peripheral device has been established according to the first communication protocol, a second connection may be established directly between the source device and the peripheral device according to a second wireless communication protocol. For example, the second wireless communication profile may be a wireless communication protocol according to the IEEE 802.11 standards an LTE protocol, or another suitable wireless communication protocol. More specifically, the second wireless communication protocol may have a larger range or a higher throughput than the first communication protocol. Details for establishing the second connection may be exchanged between the source device and the peripheral device using the first connection. In other words, the details may be exchanged "out of band" (OOB) in accordance with the first communication protocol. For example, the source device may provide access point (AP) details (such as a service set identifier (SSID), channel information, or encryption information) to the peripheral device using the first connection.

To identify wireless channel(s) that avoid interference and provide sufficient data throughput for the one or more data streams, the source device may perform one or more channel scan operations when establishing the second connection with the peripheral device (such as one or more automatic channel selection (ACS) operations). In an example ACS operation, a wireless communication device may scan each wireless channel in a list of wireless channels, and rank each wireless channel in the list based on factors such as, for example, the number of basic service sets (BSSs) or service set identifiers (SSIDs) detected on the wireless channel, a minimum or maximum received signal strength indicator (RSSI) associated with the SSIDs detected on the wireless channel, a noise floor on the wireless channel, or a measure of the proportion of time the channel is occupied, among other examples. The ACS operation may then select the best channel based on the ranking. Establishing the first connection and the second connection may consume a significant amount of time (sometimes exceeding ten seconds). It is therefore desirable to reduce the time required for establishing the first connection and the second connection in order to improve user experience for users of peripheral devices.

Various aspects relate generally to offloading some or all of the channel scan operations from a source device to a peripheral device. In some implementations, a first wireless communication device, such as a peripheral device, may establish a first connection with a second wireless communication device, such as a source device, in accordance with a first communication protocol. The first wireless communication device may perform a first channel scan of a first set of wireless channels in response to establishing the first connection. The first channel scan may be associated with a second wireless communication protocol. The first wireless communication device may then establish a second connection directly with the second wireless communication device in accordance with the second wireless communication protocol. For example, the peripheral device may perform all or part of the channel scan while concurrently establishing the first connection with the source device. In some other aspects, each of the source device and the peripheral device may perform a channel scan, ensuring the channel selected for the second connection performs well at both the source device and the peripheral device, particularly in noisy environments.

Particular implementations of the subject matter described in this disclosure can be implemented to realize one or more of the following potential advantages. By offloading all or part of a channel scan to a peripheral device, the second connection may be established directly between the source device and the peripheral device more quickly than using conventional techniques (where the source device performs the entire channel scan), which may result in improved user experience. More particularly, a source device may require channel scan results before it begins to operate as an AP in accordance with the second wireless communication protocol, and so offloading at least a portion of the channel scan operations to the peripheral device may allow the source device to receive these channel scan results more quickly. In some examples in which the first communication protocol is BLE and the second wireless communication protocol is a Wi-Fi protocol, offloading the channel scan entirely onto the peripheral device may reduce the time required to establish the second connection by several seconds.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz, or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (µs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or CCC20 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2:
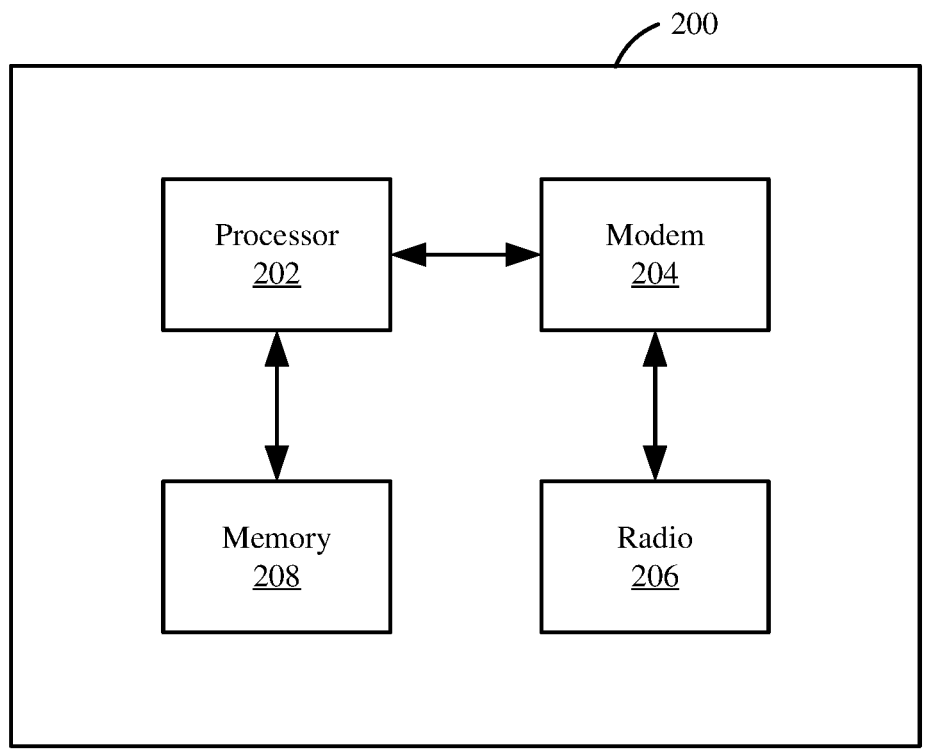
FIG. 2 shows a block diagram of an example wireless communication device.

FIG. 2 shows a block diagram of an example wireless communication device 200. In some implementations, the wireless communication device 200 can be an example of a device for use in a STA such as one of the STAs 104 described above with reference to FIG. 1. In some implementations, the wireless communication device 200 can be an example of a device for use in an AP such as the AP 102 described above with reference to FIG. 1. The wireless communication device 200 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 200 can be, or can include, a chip, system on chip (SoC), chipset, package or device that includes one or more modems 204, for example, a Wi-Fi (IEEE 802.11 compliant) modem. In some implementations, the one or more modems 204 (collectively "the modem 204") additionally include a WWAN modem (for example, a 3GPP 4G LTE or 5G compliant modem). In some implementations, the wireless communication device 200 also includes one or more processors, processing blocks or processing elements 202 (collectively "the processor 202") coupled with the modem 204. In some implementations, the wireless communication device 200 additionally includes one or more radios 206 (collectively "the radio 206") coupled with the modem 202. In some implementations, the wireless communication device 200 further includes one or more memory blocks or elements 208 (collectively "the memory 208") coupled with the processor 204 or the modem 204.

The modem 204 can include an intelligent hardware block or device such as, for example, an application-specific integrated circuit (ASIC), among other examples. The modem 204 is generally configured to implement a PHY layer, and in some implementations, also a portion of a MAC layer (for example, a hardware portion of the MAC layer). For example, the modem 204 is configured to modulate packets and to output the modulated packets to the radio 206 for transmission over the wireless medium. The modem 204 is similarly configured to obtain modulated packets received by the radio 206 and to demodulate the packets to provide demodulated packets. In addition to a modulator and a demodulator, the modem 204 may further include digital signal processing (DSP) circuitry, automatic gain control (AGC) circuitry, a coder, a decoder, a multiplexer and a demultiplexer. For example, while in a transmission mode, data obtained from the processor 202 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 206. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 206, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 202) for processing, evaluation, or interpretation.

The radio 206 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 200 can include, or be coupled with, multiple transmit antennas (each with a corresponding transmit chain) and multiple receive antennas (each with a corresponding receive chain). The symbols output from the modem 204 are provided to the radio 206, which then transmits the symbols via the coupled antennas. Similarly, symbols received via the antennas are obtained by the radio 206, which then provides the symbols to the modem 204.

The processor 202 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 202 processes information received through the radio 206 and the modem 204, and processes information to be output through the modem 204 and the radio 206 for transmission through the wireless medium. For example, the processor 202 may implement a control plane and at least a portion of a MAC layer configured to perform various operations related to the generation, transmission, reception, and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 202 may generally control the modem 204 to cause the modem to perform various operations described above.

The memory 208 can include tangible storage media such as random-access memory (RAM) or read-only memory (ROM), or combinations thereof. The memory 208 also can store non-transitory processor- or computer-executable software (SW) code containing instructions that, when executed by the processor 202, cause the processor to perform various operations described herein for wireless communication, including the generation, transmission, reception, and interpretation of MPDUs, frames or packets. For example, various functions of components disclosed herein, or various blocks or steps of a method, operation, process, or algorithm disclosed herein, can be implemented as one or more modules of one or more computer programs.

Figure 3B:
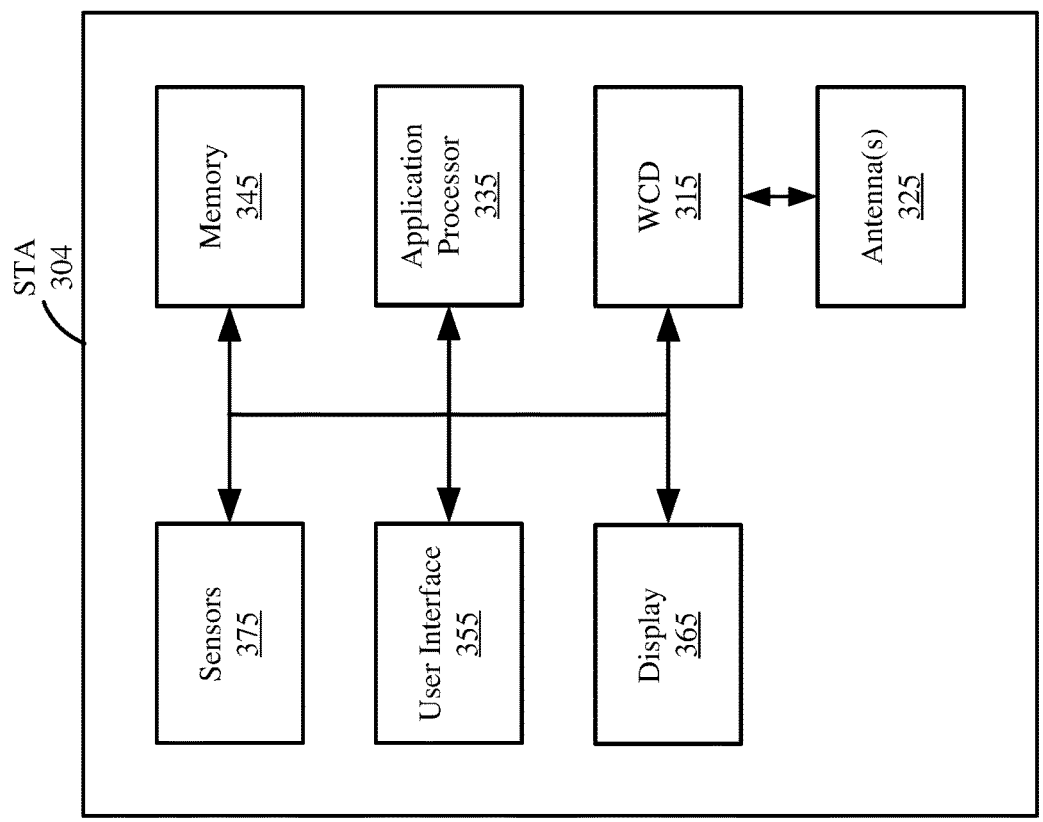
FIG. 3B shows a block diagram of an example station (STA).
Figure 3A:
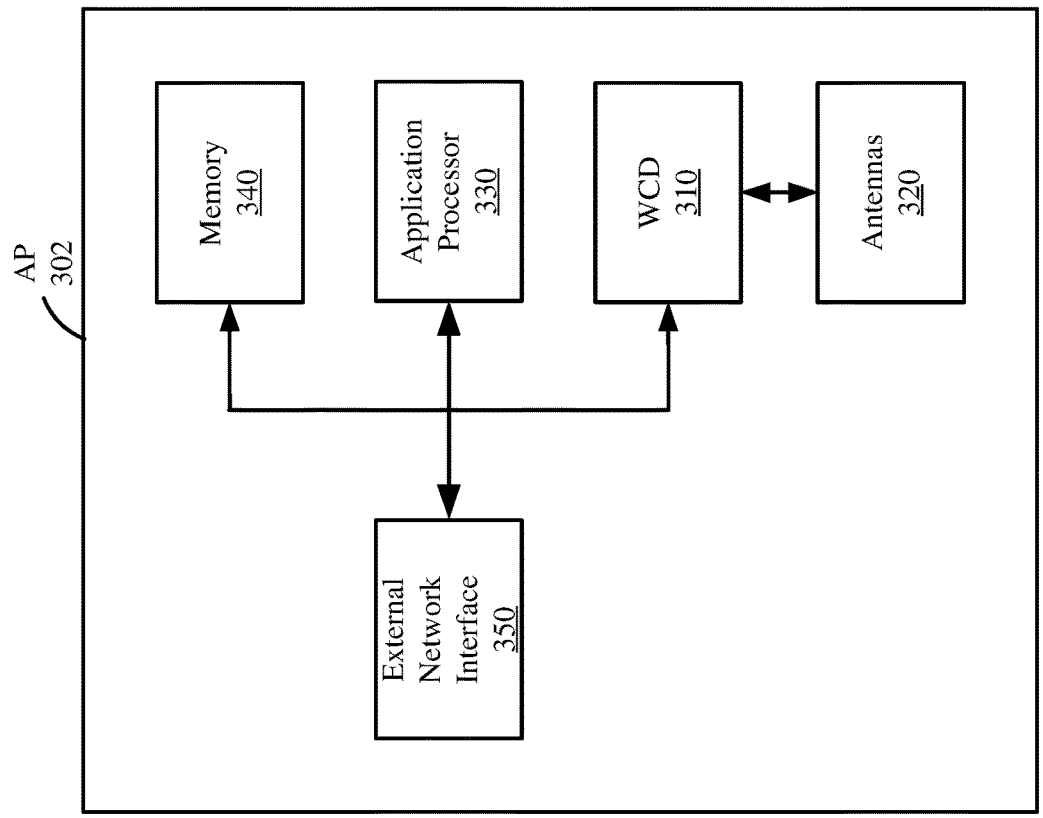
FIG. 3A shows a block diagram of an example access point (AP).

FIG. 3A shows a block diagram of an example AP 302. For example, the AP 302 can be an example implementation of the AP 102 described with reference to FIG. 1. The AP 302 includes a wireless communication device (WCD) 310 (although the AP 302 may itself also be referred to generally as a wireless communication device as used herein). For example, the wireless communication device 310 may be an example implementation of the wireless communication device 200 described with reference to FIG. 2. The AP 302 also includes multiple antennas 320 coupled with the wireless communication device 310 to transmit and receive wireless communications. In some implementations, the AP 302 additionally includes an application processor 330 coupled with the wireless communication device 310, and a memory 340 coupled with the application processor 330. The AP 302 further includes at least one external network interface 350 that enables the AP 302 to communicate with a core network or backhaul network to gain access to external networks including the Internet. For example, the external network interface 350 may include one or both of a wired (for example, Ethernet) network interface and a wireless network interface (such as a WWAN interface). Ones of the aforementioned components can communicate with other ones of the components directly or indirectly, over at least one bus. The AP 302 further includes a housing that encompasses the wireless communication device 310, the application processor 330, the memory 340, and at least portions of the antennas 320 and external network interface 350.

FIG. 3B shows a block diagram of an example STA 304. For example, the STA 304 can be an example implementation of the STA 104 described with reference to FIG. 1. The STA 304 includes a wireless communication device 315 (although the STA 304 may itself also be referred to generally as a wireless communication device as used herein). For example, the wireless communication device 315 may be an example implementation of the wireless communication device JJJ00 described with reference to Figure JJJ. The STA 304 also includes one or more antennas 325 coupled with the wireless communication device 315 to transmit and receive wireless communications. The STA 304 additionally includes an application processor 335 coupled with the wireless communication device 315, and a memory 345 coupled with the application processor 335. In some implementations, the STA 304 further includes a user interface (UI) 355 (such as a touchscreen or keypad) and a display 365, which may be integrated with the UI 355 to form a touchscreen display. In some implementations, the STA 304 may further include one or more sensors 375 such as, for example, one or more inertial sensors, accelerometers, temperature sensors, pressure sensors, or altitude sensors. Ones of the aforementioned components can communicate with other ones of the components directly or indirectly, over at least one bus. The STA 304 further includes a housing that encompasses the wireless communication device 315, the application processor 335, the memory 345, and at least portions of the antennas 325, UI 355, and display 365.

Figure 3C:
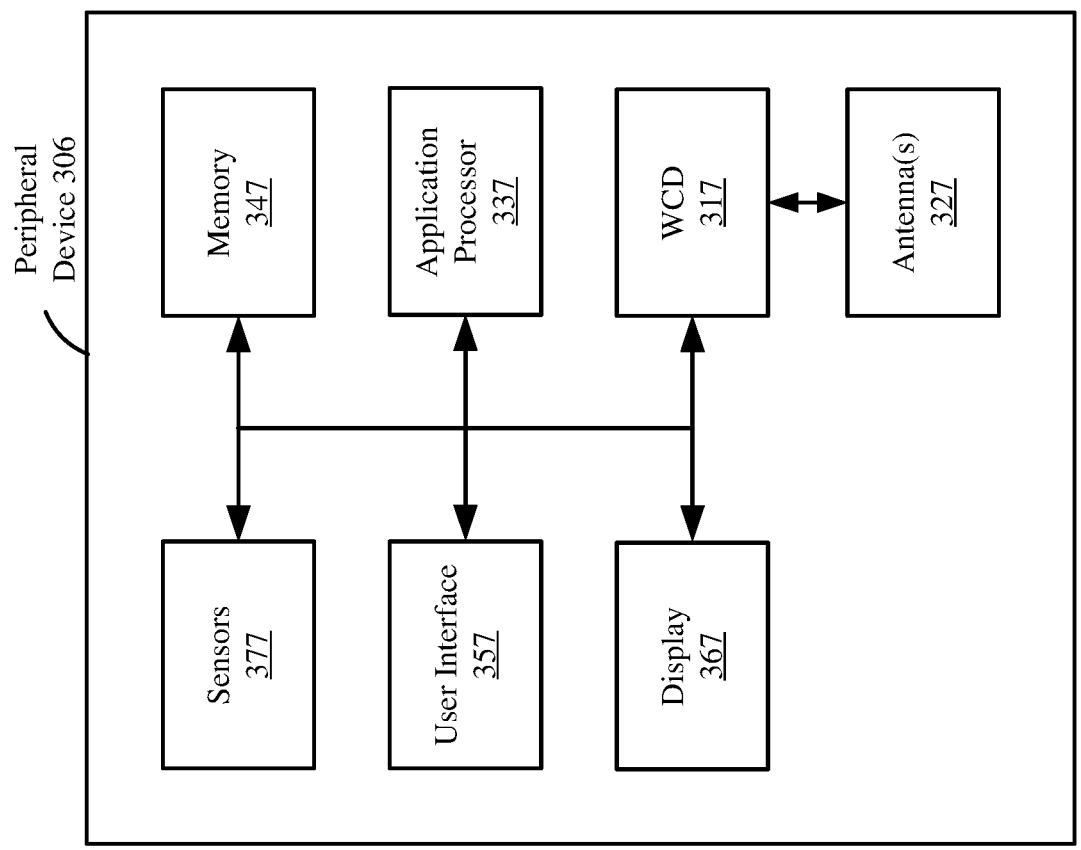
FIG. 3C shows a block diagram of an example peripheral device.

FIG. 3C shows a block diagram of an example peripheral device 306. The peripheral device 306 can be a wireless device configured for receiving one or more data streams from a STA using a device to device wireless communication protocol. For example, the peripheral device 306 may be a headset (HMD) configured for AR, VR, or other XR applications, a wireless speaker, headphones, headset, video display devices, among other examples. The peripheral device 306 includes a wireless communication device 317 (although the peripheral device 306 may itself also be referred to generally as a wireless communication device as used herein). For example, the wireless communication device 317 may be an example implementation of the wireless communication device 200 described with reference to FIG. 2. The peripheral device 306 also includes one or more antennas 327 coupled with the wireless communication device 317 to transmit and receive wireless communications. The peripheral device 306 additionally includes an application processor 337 coupled with the wireless communication device 317, and a memory 347 coupled with the application processor 337. In some implementations, the peripheral device 306 further includes a user interface (UI) 357 (such as a touchscreen or keypad) and a display 367, which may be integrated with the UI 357 to form a touchscreen display. In some implementations, the peripheral device 306 may further include one or more sensors 377 such as, for example, one or more inertial sensors, accelerometers, temperature sensors, pressure sensors, or altitude sensors. Ones of the aforementioned components can communicate with other ones of the components directly or indirectly, over at least one bus. The peripheral device 306 further includes a housing that encompasses the wireless communication device 317, the application processor 337, the memory 347, and at least portions of the antennas 327, UI 357, and display 367.

Figure 4:
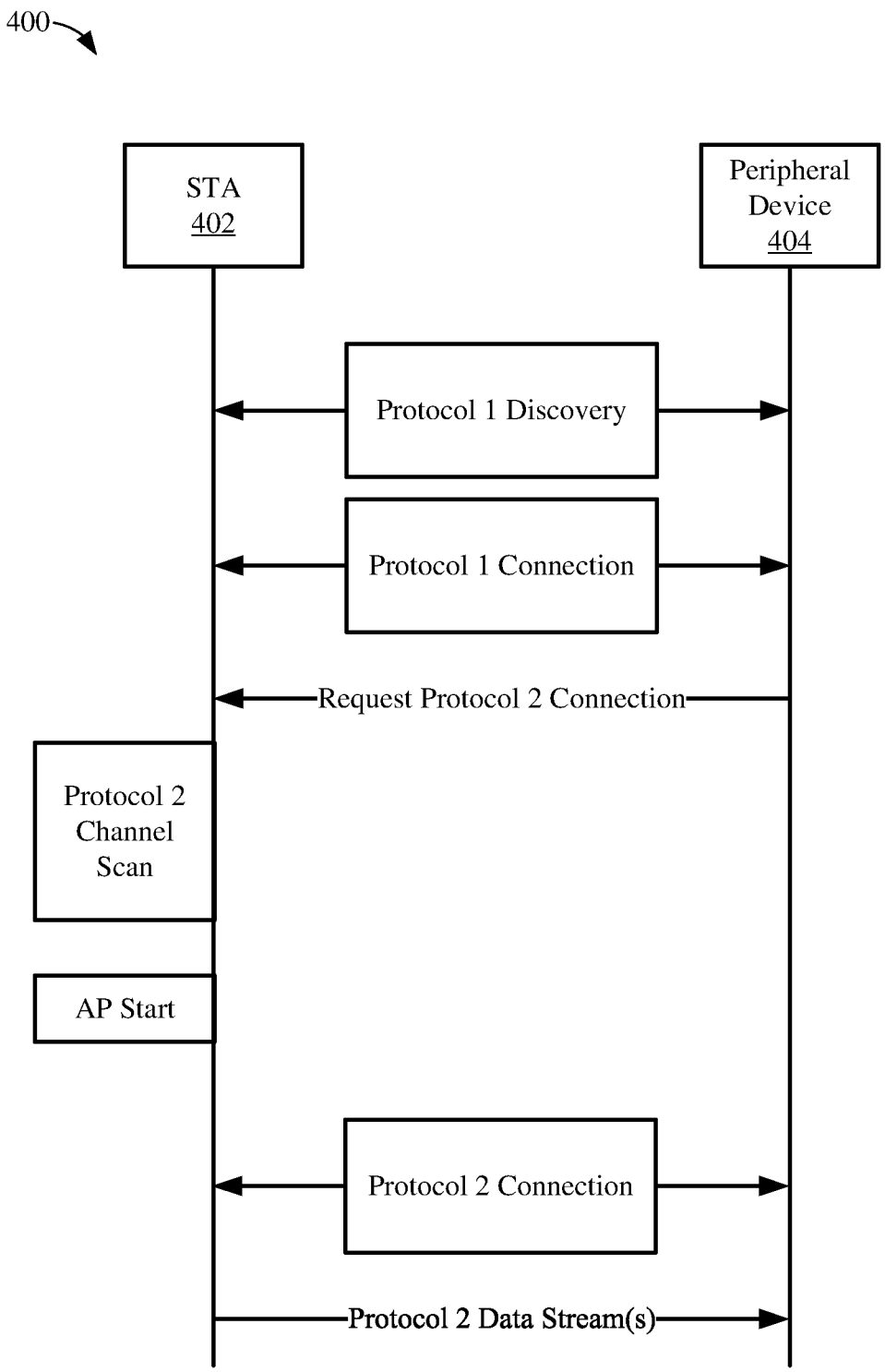
FIG. 4 shows a sequence diagram depicting a process for establishing a wireless link between a STA and a peripheral device.

FIG. 4 shows a sequence diagram 400 depicting a process for establishing a wireless link between a STA 402 and a peripheral device 404. In the example of FIG. 4, a STA 402 and a peripheral device 404 may establish a first connection according to a first communication protocol ("Protocol 1" in FIG. 4), and subsequently establish a second connection according to a second wireless communication protocol ("Protocol 2" in FIG. 4). The STA 402 may be an example of the STA 304 of FIG. 3B, and the peripheral device 404 may be an example of the peripheral device 306 of FIG. 3C. The STA 402 and the peripheral device 404 may exchange connection information for establishing the second connection using the first communication protocol. As shown in FIG. 4, establishing the first connection may first involve discovery relating to protocol 1. For example, the STA 402 may advertise its availability to connect using protocol 1 and the peripheral device 404 may perform one or more scanning operations in response to the advertisement. When the first communication protocol is a BLE protocol, the STA 402 may advertise its universally unique identifier (UUID), one or more device IDs, or one or more capabilities, among other examples. The peripheral device 404 may receive this advertisement and establish the first connection with the STA 402 according to the first communication protocol. For example, when the first communication protocol is BLE, the peripheral device 404 may operate as a Generic Attribute Profile (GATT) server and the STA 402 may connect to this GATT server. After the first connection has been established according to the first communication protocol, the peripheral device 404 may request to establish the second connection according to the second wireless communication protocol. This request may be expressly communicated or may be implied (such as where successful establishment of the first connection automatically prompts establishment of the second connection). In response to the request for establishment of the second connection, the STA 402 may perform a channel scan associated with the second wireless communication protocol. For example, the STA 402 may scan a set of wireless channels associated with one or more frequency bands, such as a 2 GHz, a 5 GHz, or a 6 GHz frequency band. When the second wireless communication protocol is a Wi-Fi protocol, this channel scan may be an ACS channel scan.

After completing the channel scan, the STA 402 may transmit one or more results of the channel scan to the peripheral device 404 using the first connection. As such, the results are transmitted according to the first communication protocol. Such results may indicate one or more best performing channels from the channel scan. After receiving the results of the channel scan, the STA 402 may operate as an AP associated with the second wireless communication protocol. For example, the STA 402 may operate as a SoftAP associated with the second wireless communication protocol. The results of the channel scan may also be transmitted with configuration information for establishing the second connection. For example, when the second wireless communication protocol is a Wi-Fi protocol, the channel scan results may be transmitted with information such as one or more SSIDs or other details for use by the peripheral device 404 to connect to the STA 402 using Wi-Fi. After receiving the channel scan results and the configuration information, the STA 402 and the peripheral device 404 may establish the second connection according to the second wireless communication protocol. After establishing the second connection, the STA 402 may transmit one or more data streams to the peripheral device 404 via the second connection.

Figures 5A, 5B:
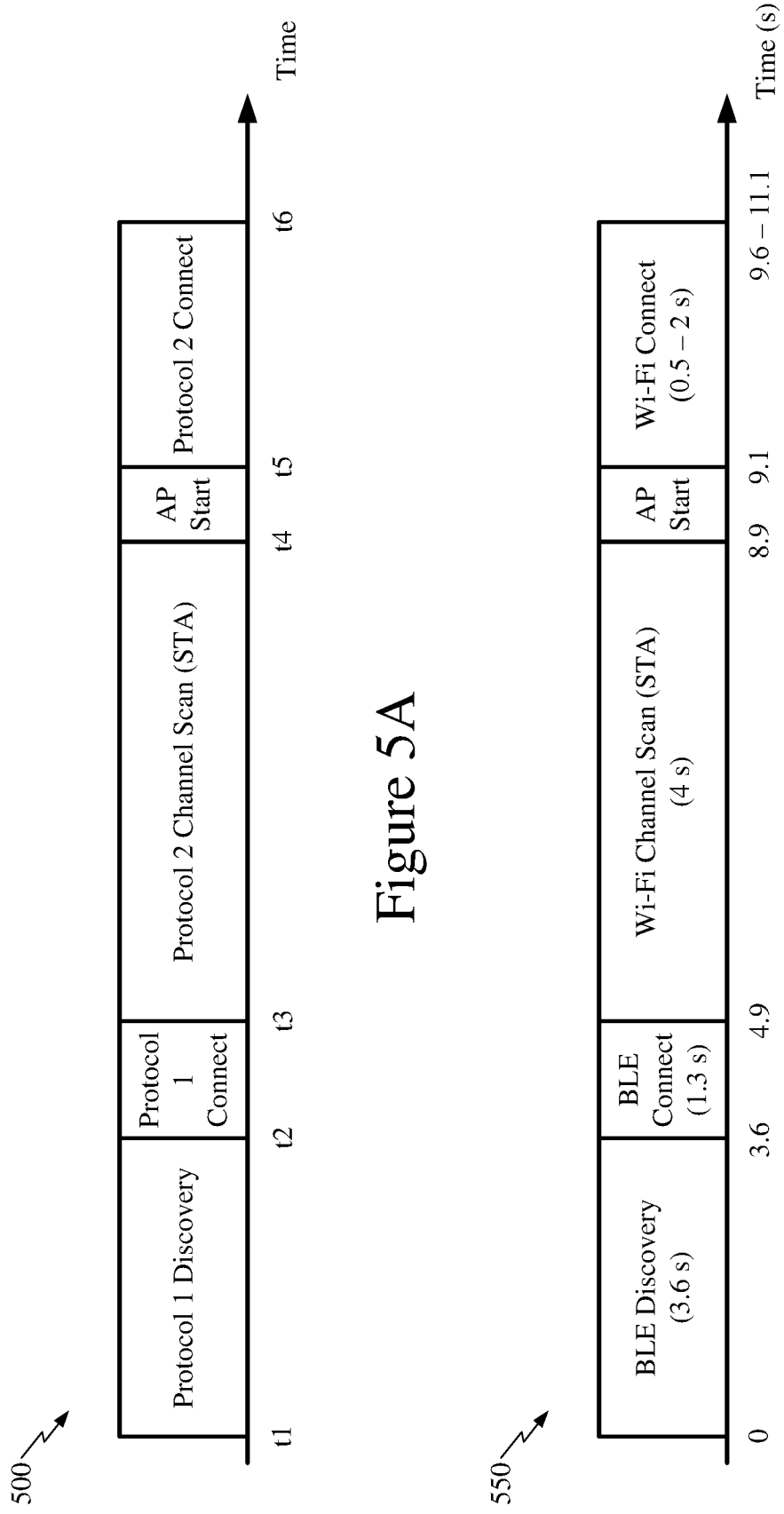
FIG. 5A shows a timing diagram depicting an example process for establishing a wireless link between the STA and the peripheral device of FIG. 4.
FIG. 5B shows a timing diagram depicting an example process for establishing a wireless link between the STA and the peripheral device of FIG. 4.

FIG. 5A shows a timing diagram depicting an example process 500 for establishing a wireless link between the STA 402 and the peripheral device 404. The example process 500 may be performed by the STA 402 and the peripheral device 404, for example, as shown in the sequence diagram 400 of FIG. 4. Note that the relative durations of the operations in FIG. 5A (and in subsequent timing diagrams) are not shown to scale and may vary, due to a number of factors, for example depending on the protocols used for the first connection and the second connection. The STA 402 and the peripheral device 404 perform Protocol 1 discovery between times t1 and t2. The STA 402 and the peripheral device 404 perform Protocol 1 connection between times t2 and t3. The STA 304 performs the protocol 2 channel scan between times t3 and t4. The STA 402 starts AP operations between times t4 and t5. The STA 402 and the peripheral device 404 establish the second connection, according to protocol 2, between times t5 and t6, after which the STA 402 may transmit one or more data streams to the peripheral device 404.

FIG. 5B shows a timing diagram depicting an example process 550 for establishing a wireless link between the STA 402 and the peripheral device 404. More particularly, the example process 550 depicts typical timing of the operations shown in FIG. 4 when the first communication protocol is a BLE protocol, and the second wireless communication protocol is a Wi-Fi protocol. The STA 402 and the peripheral device 404 may complete BLE discovery in roughly 3.6 seconds. The STA 402 and the peripheral device 404 may establish the BLE connection after BLE discovery in roughly 1.3 seconds. The STA 402 may complete the Wi-Fi channel scan in roughly 4 seconds. The STA 402 may begin AP operations in roughly 200 ms. Finally, The STA 402 and the peripheral device 404 may establish the second connection according to the Wi-Fi protocol in between 0.5 and 2 seconds. Thus, the operations shown in FIG. 4 for establishing the first connection and the second connection using conventional techniques may take approximately 9.6-11.1 seconds.

Various aspects relate generally to offloading some or all of the channel scan operations from a source device to a peripheral device. In some implementations, a first wireless communication device, such as a peripheral device, may establish a first connection with a second wireless communication device, such as a source device, in accordance with a first communication protocol. The first wireless communication device may perform a first channel scan of a first set of wireless channels in response to establishing the first connection. The first channel scan may be associated with a second wireless communication protocol. The first wireless communication device may then establish a second connection directly with the second wireless communication device in accordance with the second wireless communication protocol. For example, the peripheral device may perform all or part of the channel scan while concurrently establishing the first connection with the source device. In some other aspects, each of the source device and the peripheral device may perform a channel scan, ensuring the channel selected for the second connection performs well at both the source device and the peripheral device, particularly in noisy environments.

Particular implementations of the subject matter described in this disclosure can be implemented to realize one or more of the following potential advantages. By offloading all or part of a channel scan to a peripheral device, the second connection may be established directly between the source device and the peripheral device more quickly than using conventional techniques where the source device performs the entire channel scan. By offloading at least a portion of the channel scan to the peripheral device, the wireless communication devices may establish second connection more quickly, resulting in more efficient operations and improved user experience. More particularly, a source device may require channel scan results before it begins to operate as an AP in accordance with the second wireless communication protocol, and so offloading at least a portion of the channel scan operations to the peripheral device may allow the source device to receive these channel scan results more quickly. For example, when the first communication protocol is BLE, and the second wireless communication protocol is Wi-Fi, offloading the channel scan entirely onto the peripheral device may reduce the time required to establish the second connection by several seconds.

As discussed above, aspects of the present disclosure allow for the establishment of the first connection and the second connection between a source device and a peripheral device to be completed more quickly and efficiently by offloading at least a portion of the channel scan associated with the second wireless communication protocol to the peripheral device. In some implementations, the entire channel scan may be performed by the peripheral device. Such implementations may allow a significant reduction in the time required for establishing the first connection and the second connection. However, such implementations require that the peripheral device to have the computing and network resources to perform the full channel scan. In some other implementations, the peripheral device may only perform a first portion of the channel scan, such as by scanning only a portion of the set of wireless channels associated with the channel scan, while the source device may scan a second portion including a remainder of the wireless channels in the set of wireless channels.

In some aspects, the first portion may include all wireless channels in the set of wireless channels associated with a particular frequency band. For example, the first portion may include all wireless channels in a 2 GHz frequency band, in a 5 GHz frequency band, or in a 6 GHz frequency band. In some other implementations, when more robust channel scanning is desired, for example in congested or noisy environments, the peripheral device and the source device may collectively perform the channel scan. In some aspects, the peripheral device and the source device may each scan all wireless channels in the set of wireless channels. In some other aspects, the peripheral device and the source device may both scan some but not all wireless channels in the set of wireless channels, with the source device or the peripheral device scanning a remainder of the wireless channels in the set. In other words, in some aspects, each of the source device and the peripheral device may scan all wireless channels in a first portion of the set of wireless channels, while a remainder of the wireless channels in the set of wireless channels may be scanned by either the source device or the peripheral device. Duplicating all or a portion of the channel scan between the peripheral device and the source device may allow for selection of a channel which performs well at both the source device and the peripheral device.

Figure 6:
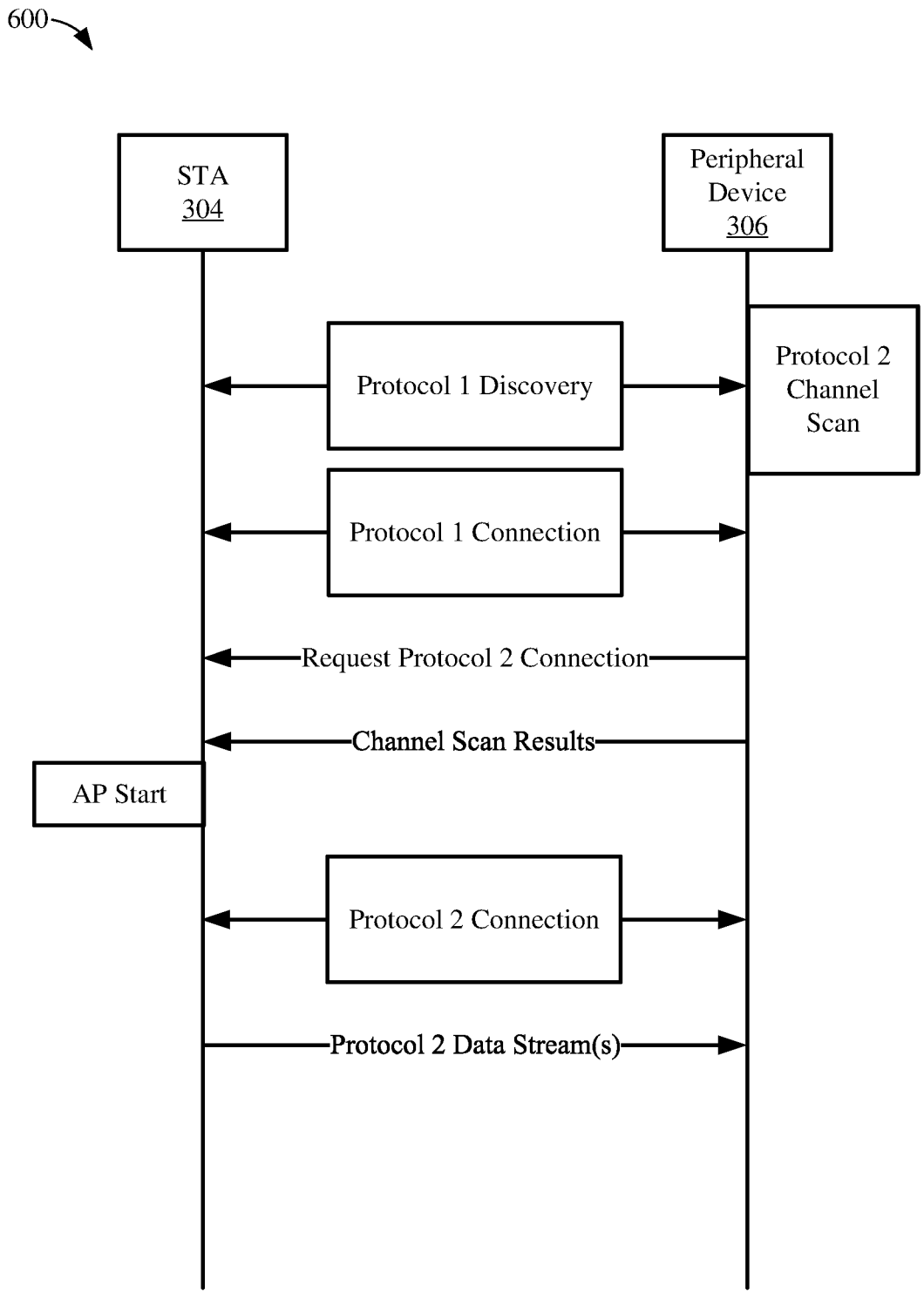
FIG. 6 shows a sequence diagram depicting an example process for establishing a wireless link between a STA and a peripheral device, according to some implementations.

FIG. 6 shows an example sequence diagram 600 depicting an example process for establishing a wireless link between the STA 304 and the peripheral device 306, according to some implementations. Similar to FIG. 4, the operations shown in FIG. 6 include protocol 1 discovery and protocol 1 connection, however, in FIG. 6 the peripheral device 306 performs the channel scan associated with the second wireless communication protocol. In other words, in FIG. 6 this channel scan is fully offloaded onto the peripheral device. For example, the peripheral device 306 may scan a set of wireless channels associated with one or more frequency bands, such as a 2 GHz, a 5 GHz, or a 6 GHz frequency band. When the second wireless communication protocol is a Wi-Fi protocol, this channel scan may be an ACS channel scan.

After completing the channel scan and establishing the first connection according to the first communication protocol, the peripheral device 306 requests establishment of the second connection according to the second wireless communication protocol. Similar to FIG. 4, this request may be expressly communicated, or may be implied (such as where successful establishment of the first connection automatically prompts establishment of the second connection). The peripheral device 306 may also transmit one or more results of the completed channel scan to the STA 304. As such, the results are transmitted according to the first communication protocol via the first connection. The STA 304 may start operating as an AP after receiving the one or more results of the completed channel scan. Further, the STA 304 may transmit connection information to the peripheral device associated with the second wireless communication protocol (not shown for simplicity). The STA 304 and the peripheral device 306 may then establish the second connection according to the second wireless communication protocol. Subsequently the STA 304 may transmit one or more data streams may to the peripheral device 306 via the second connection (according to the second wireless communication protocol).

Figure 7A:
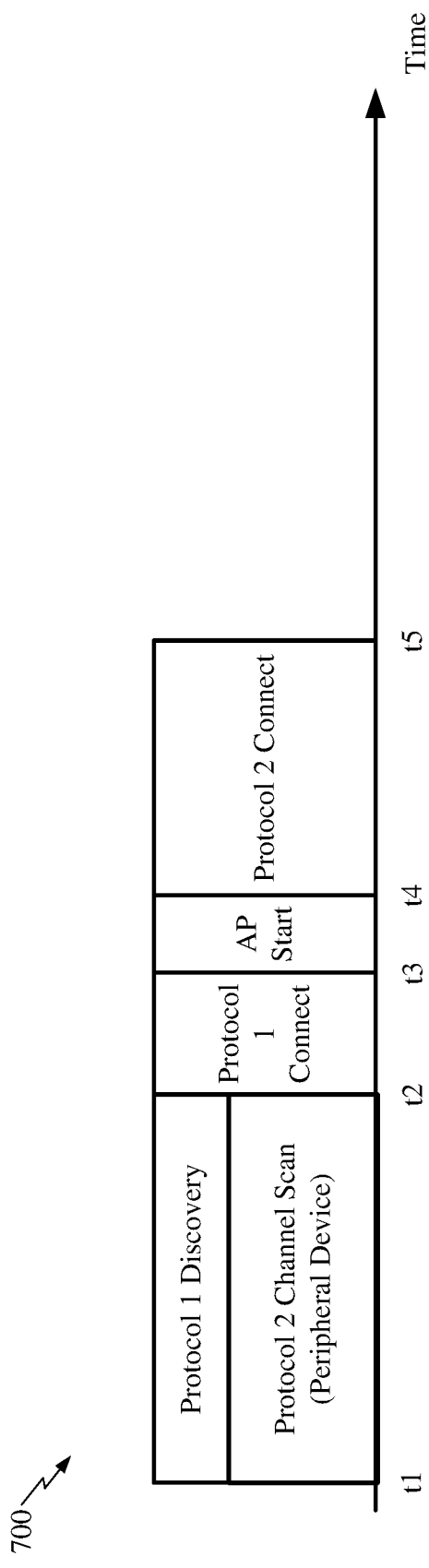
FIG. 7A shows a timing diagram depicting an example process for establishing a wireless link between the STA and the peripheral device of FIG. 6, according to some implementations.

FIG. 7A shows an example timing diagram depicting an example process 700 for establishing a wireless link between the STA 304 and the peripheral device 306, according to some implementations. The example process 700 may correspond to the sequence diagram 600 of FIG. 6. Note that the relative durations of the operations in FIG. 7A are not shown to scale and may vary, due to a number of factors, for example depending on the protocols used for the first connection and the second connection. The STA 304 and the peripheral device 306 may perform Protocol 1 discovery between times t1 and t2. Concurrently with protocol 1 discovery, the peripheral device 306 may perform the channel scan associated with the second wireless communication protocol. Note that while FIG. 7A shows protocol 1 discovery and the protocol 2 channel scan requiring the same amount of time, in some aspects either the protocol 1 discovery or the protocol 2 channel scan may take more time to complete. The STA 304 and the peripheral device 306 may perform Protocol 1 connection between times t2 and t3. The STA 304 may perform AP start between times t3 and t4. The STA 304 and the peripheral device 306 may establish the second connection according to protocol 2 between times t4 and t5. Subsequently, the STA 304 may transmit one or more data streams to the peripheral device 306 via the second connection.

Figure 7B:
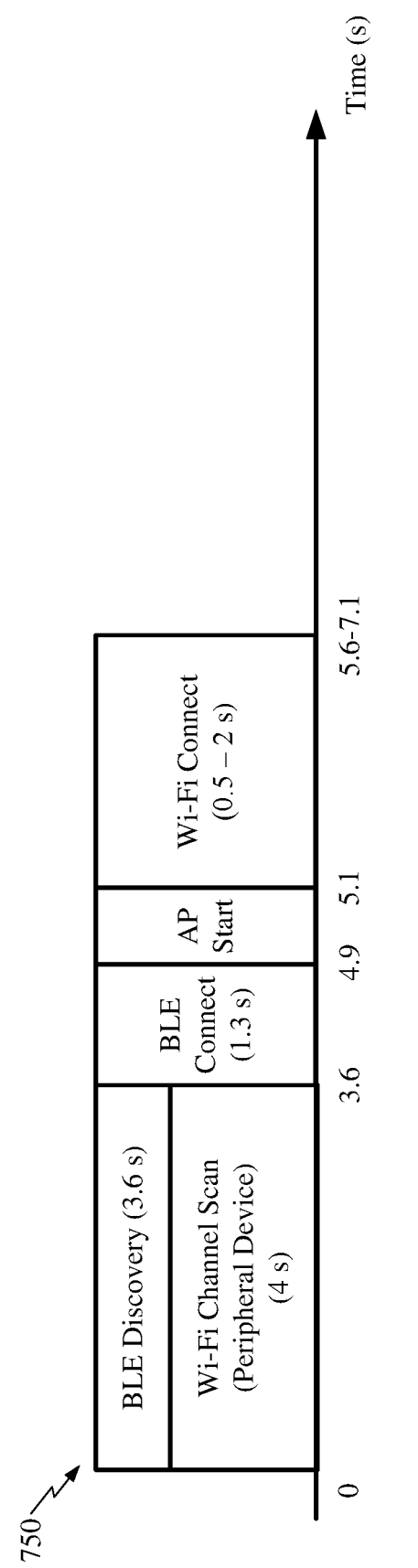
FIG. 7B shows a timing diagram depicting an example process for establishing a wireless link between the STA and the peripheral device of FIG. 6, according to some implementations.

FIG. 7B shows a timing diagram depicting an example process 750 for establishing a wireless link between the STA 304 and the peripheral device 306, according to some implementations. More particularly, the example process 750 depicts typical timing of the operations shown in FIG. 6 when the first communication protocol is a BLE protocol, and the second wireless communication protocol is a Wi-Fi protocol. The STA 304 and the peripheral device 306 may complete BLE discovery in roughly 3.6 seconds. The peripheral device 306 may complete the Wi-Fi channel scan in roughly 4 seconds. The STA 304 and the peripheral device 306 may establish the BLE connection after BLE discovery in roughly 1.3 seconds. The STA 304 may begin operation as an AP in roughly 200 ms. Finally, The STA 304 and the peripheral device 306 may establish the second connection according to the Wi-Fi protocol in between 0.5 and 2 seconds. Thus, the operations shown in FIG. 7B for establishing the first connection and the second connection may take approximately 5.6-7.1 seconds when the channel scan is fully offloaded to the peripheral device, representing a time savings of roughly 4 seconds as compared with conventional techniques as shown in FIG. 5B.

Figure 8:
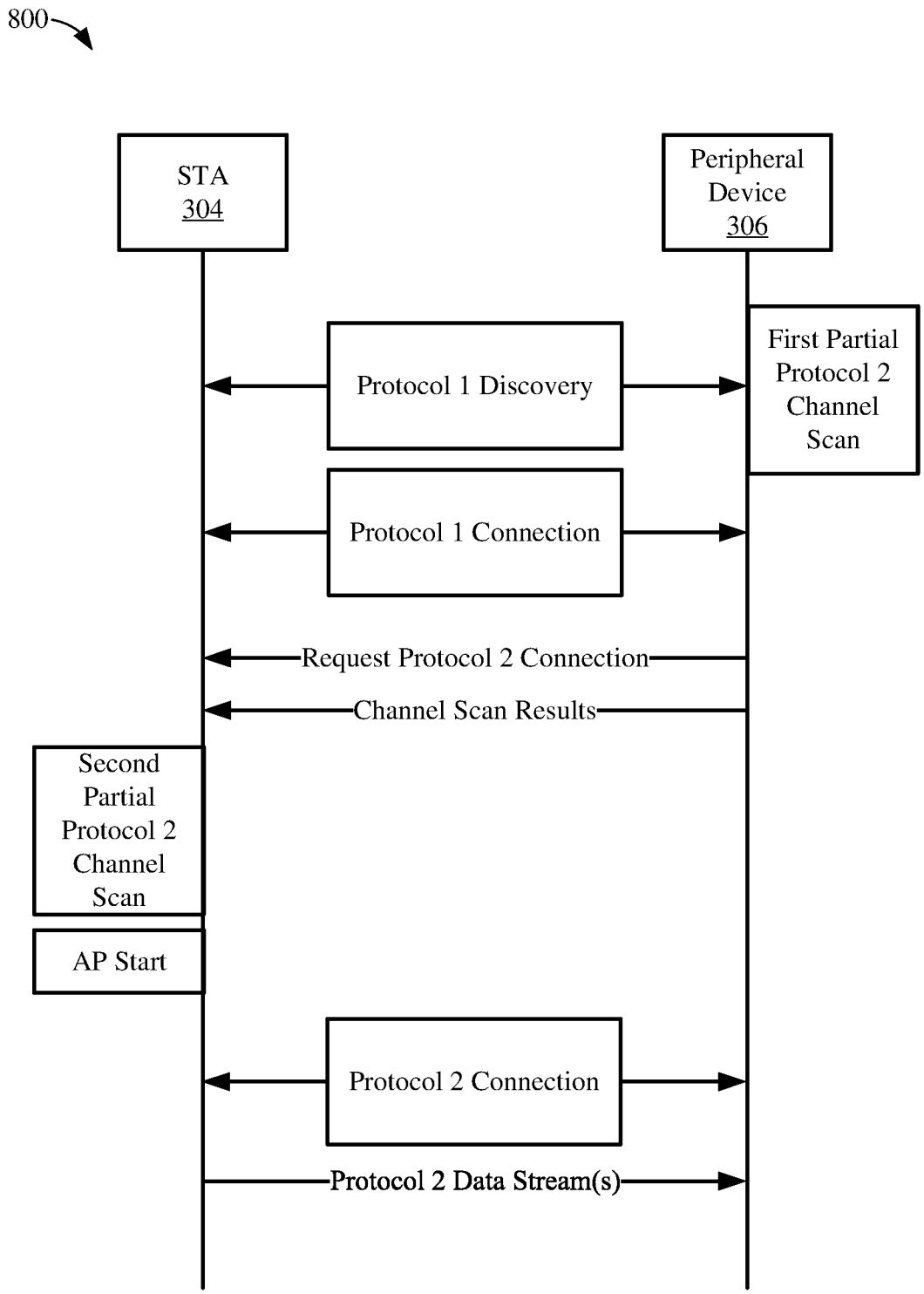
FIG. 8 shows a sequence diagram depicting an example process for establishing a wireless link between a STA and a peripheral device, according to some implementations.

As discussed above, in some implementations, rather than fully offloading the channel scan to the peripheral device, The STA may offload only a portion of the channel scan to the peripheral device. FIG. 8 shows an example sequence diagram 800 depicting an example process for establishing a wireless link between the STA 304 and the peripheral device 306, according to some implementations. Similar to FIG. 6, the operations shown in FIG. 8 offload some of the channel scan to the peripheral device 306. However, in FIG. 8 the peripheral device 306 performs only a portion of the channel scan, while the STA 304 performs another portion of the channel scan. In other words, in FIG. 8 the channel scan is only partially offloaded onto the peripheral device 306. Similar to FIG. 6, concurrently with protocol 1 discovery the peripheral device 306 performs a first partial channel scan associated with the second wireless communication protocol. For example, the peripheral device 306 may scan a first set of wireless channels associated with one or more frequency bands, such as a 2 GHz, a 5 GHz, or a 6 GHz frequency band. When the second wireless communication protocol is a Wi-Fi protocol, this first partial channel scan may be an ACS channel scan.

After the peripheral device 306 completes the first partial channel scan, and the STA 304 and peripheral device 306 establish the first connection according to the first communication protocol, the peripheral device 306 requests establishment of the second connection according to the second wireless communication protocol. Similar to FIG. 6, this request may be expressly communicated, or may be implied (such as where successful establishment of the first connection automatically prompts establishment of the second connection). In some examples the peripheral device 306 may then transmit one or more results of the completed channel scan to the STA 304 in accordance with the first communication protocol (via the first connection). Note that while FIG. 8 shows the peripheral device 306 transmitting the channel scan results after requesting establishment of the second connection, that the peripheral device may transmit the channel scan results at any time after completion of the first partial channel scan and before the STA 304 starts operating as an AP. The STA 304 then performs a second partial channel scan associated with the second wireless communication protocol. For example, the STA may scan a second set of wireless channels associated with the one or more frequency bands, such as 2 GHz, 5 GHz, or 6 GHz frequency bands. In some aspects, no wireless channels in the first set of wireless channels are also in the second set of wireless channels. In other words, the STA 304 and the peripheral device 306 may scan entirely different channels.

The STA 304 then starts operating as an AP. In some aspects, the STA 304 also transmits connection information to the peripheral device associated with the second wireless communication protocol. The STA 304 and the peripheral device 306 may then establish the second connection according to the second wireless communication protocol based on the results of the first partial channel scan and the second partial channel scan. Subsequently the STA 304 may transmit one or more data streams to the peripheral device 306 according to the second wireless communication protocol.

Figures 9A, 9B:
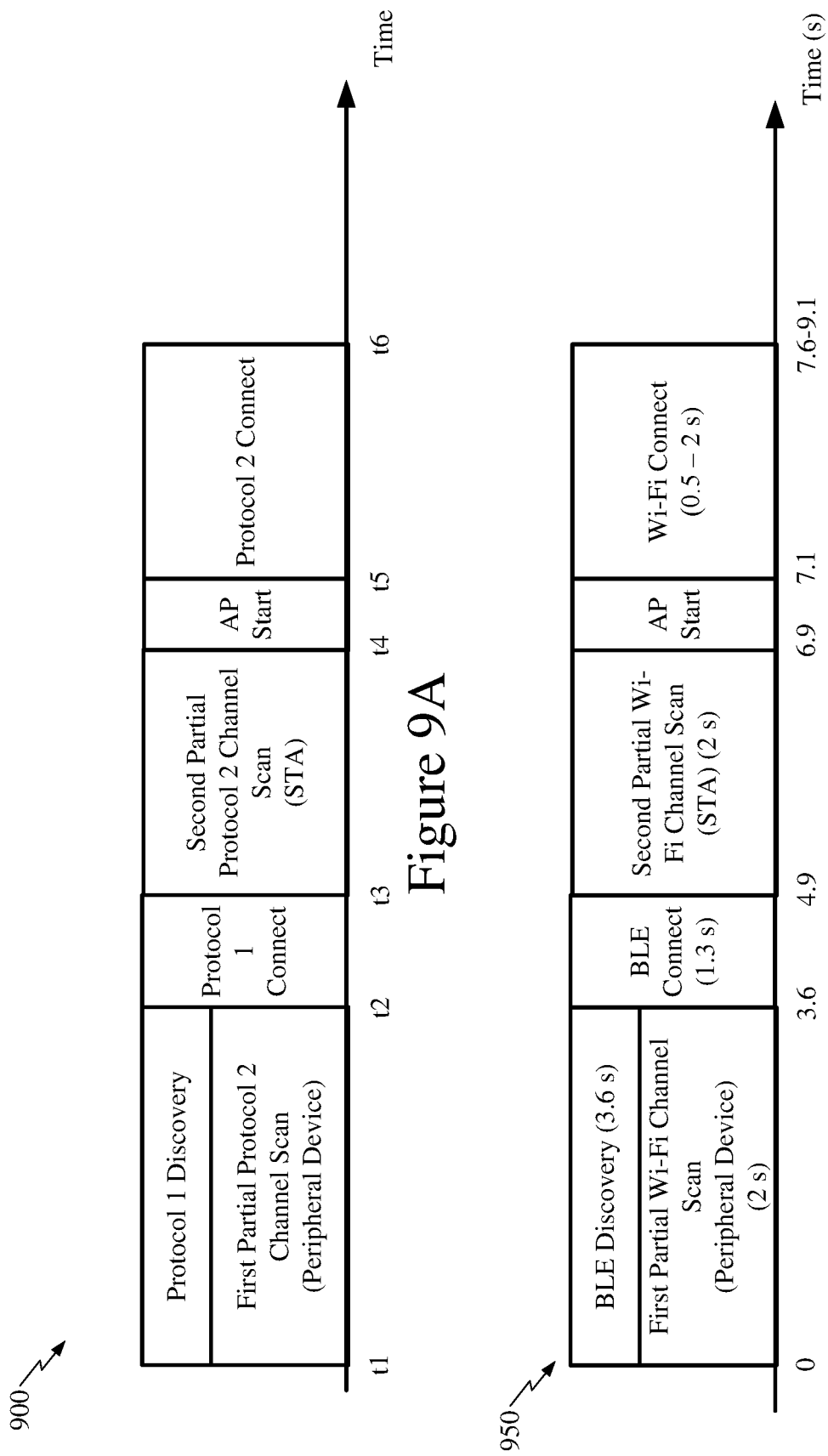
FIG. 9A shows a timing diagram depicting an example process for establishing a wireless link between the STA and the peripheral device of FIG. 8, according to some implementations.
FIG. 9B shows a timing diagram depicting an example process for establishing a wireless link between the STA and the peripheral device of FIG. 8, according to some implementations.

FIG. 9A shows an example timing diagram depicting an example process 900 for establishing a wireless link between the STA 304 and the peripheral device 306, according to some implementations. The example process 900 may correspond to the sequence diagram 800 of FIG. 8. Note that the relative durations of the operations in FIG. 9A are not shown to scale and may vary, due to a number of factors, for example depending on the protocols used for the first connection and the second connection. The STA 304 and the peripheral device 306 may complete Protocol 1 discovery between times t1 and t2. Concurrently with protocol 1 discovery, the peripheral device 306 may perform the first partial channel scan associated with the second wireless communication protocol. Note that while FIG. 9A shows these two operations requiring the same amount of time, in some aspects either the protocol 1 discovery or the protocol 2 channel scan may take more time to complete. The STA 304 and the peripheral device 306 may establish the Protocol 1 connection between times t2 and t3. The STA 304 may complete the second partial protocol 2 channel scan between times t3 and t4. The STA 304 may start operating as an AP between times t4 and t5. The STA 304 and the peripheral device 306 may establish the second connection according to protocol 2, between times t5 and t6. Subsequently, the STA 304 may transmit the one or more data streams to the peripheral device 306 via the second connection.

FIG. 9B shows a timing diagram depicting an example process 950 for establishing a wireless link between the STA 304 and the peripheral device 306, according to some implementations. More specifically, the example process 950 depicts typical timing of the operations shown in FIG.

8 when BLE and Wi-Fi are the respective first communication protocol and the second wireless communication protocol. Note that the times shown in FIG. 9B correspond to implementations when the STA 304 and the peripheral device 306 each scan approximately half of the wireless channels in the set of wireless channels associated with the full channel scan. The STA 304 and the peripheral device 306 may complete BLE discovery in roughly 3.6 seconds. The peripheral device 306 may complete the first partial Wi-Fi channel scan in roughly 2 seconds. The STA 304 and the peripheral device 306 may establish the BLE connection in roughly 1.3 seconds. The STA 304 may perform the second partial Wi-Fi channel scan in roughly 2 seconds. The STA 304 may require roughly 200 ms to start operating as an AP. The STA 304 and the peripheral device 306 may establish the second connection according to the Wi-Fi protocol in between 0.5 and 2 seconds. Thus, the STA 304 and the peripheral device 306 may establish the first connection and the second connection in approximately 7.6-9.1 seconds when the channel scan is halfway offloaded to the peripheral device, representing a time savings of roughly 2 seconds as compared with conventional techniques as shown in FIG. 5B.

While the implementations depicted in FIGS. 6-9B allow for faster establishment of the first and second connections than conventional techniques, in some other aspects, it may be preferable for the STA 304 and the peripheral device 306 each to perform a full channel scan. For example, in the presence of noise, or localized interference near one or both of the STA 304 and the peripheral device 306 it may be desirable for the STA 304 and the peripheral device 306 to each scan every wireless channel in the set of wireless channels in order to ensure a channel is chosen for the second connection which is relatively free from interference or congestion for both the STA 304 and the peripheral device 306.

Figure 10:
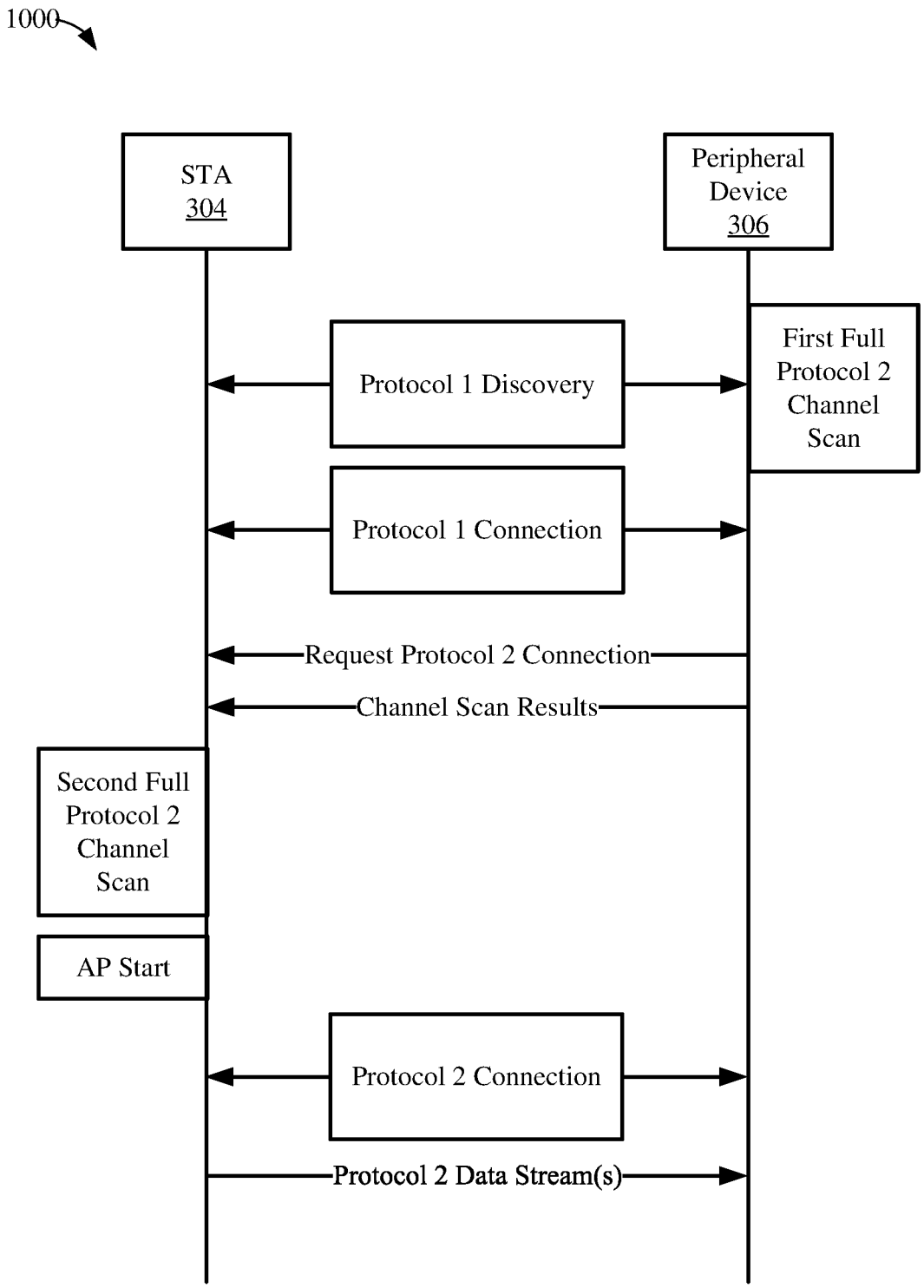
FIG. 10 shows a sequence diagram depicting an example process for establishing a wireless link between a STA and a peripheral device, according to some implementations.

FIG. 10 shows an example sequence diagram 1000 depicting an example process for establishing a wireless link between the STA 304 and the peripheral device 306, according to some implementations. Similar to FIG. 8, in FIG. 10 each of the STA 304 and the peripheral device 306 perform channel scanning operations. However, in FIG. 10 each of the STA 304 and the peripheral device 306 perform a full channel scan. That is, each of the STA 304 and the peripheral device 306 scan all wireless channels in the set of wireless channels. Concurrently with protocol 1 discovery, the peripheral device 306 may perform a first full channel scan associated with the second wireless communication protocol. For example, the peripheral device 306 may scan a first set of wireless channels associated with one or more frequency bands, such as a 2 GHz, a 5 GHz, or a 6 GHz frequency band. When the second wireless communication protocol is a Wi-Fi protocol, this first full channel scan may be an ACS channel scan.

After the peripheral device 306 completes the first full channel scan and the STA 304 and the peripheral device 306 establish the first connection according to the first communication protocol, the peripheral device 306 transmits one or more results of the first full channel scan to the STA 304. Similar to FIG. 8, the peripheral device 306 may transmit one or more results of the first full channel scan to the STA 304 at any time after completion of the first full channel scan and prior to the STA 304 starting to operate as an AP. The peripheral device 306 may also request establishment of the second connection according to the second wireless communication protocol. Similar to FIG. 6, this request may be expressly communicated, or may be implied (such as where successful establishment of the first connection automatically prompts establishment of the second connection). The STA 304 may then start operating as an AP and perform a second full channel scan associated with the second wireless communication protocol. For example, the STA 304 may scan the first set of wireless channels associated with the one or more frequency bands. In other words, the STA 304 and the peripheral device 306 may each scan every wireless channel in the first set of wireless channels.

The STA 304 may then transmit connection information, associated with the second wireless communication protocol, to the peripheral device 306. The STA 304 may transmit such information using the first connection, according to the first communication protocol. The STA 304 and the peripheral device 306 may then establish the second connection according to the second wireless communication protocol and based on the results of the first full channel scan and the second full channel scan. Subsequently the STA 304 may transmit the one or more data streams to the peripheral device 306 according to the second wireless communication protocol.

Figures 11A, 11B:
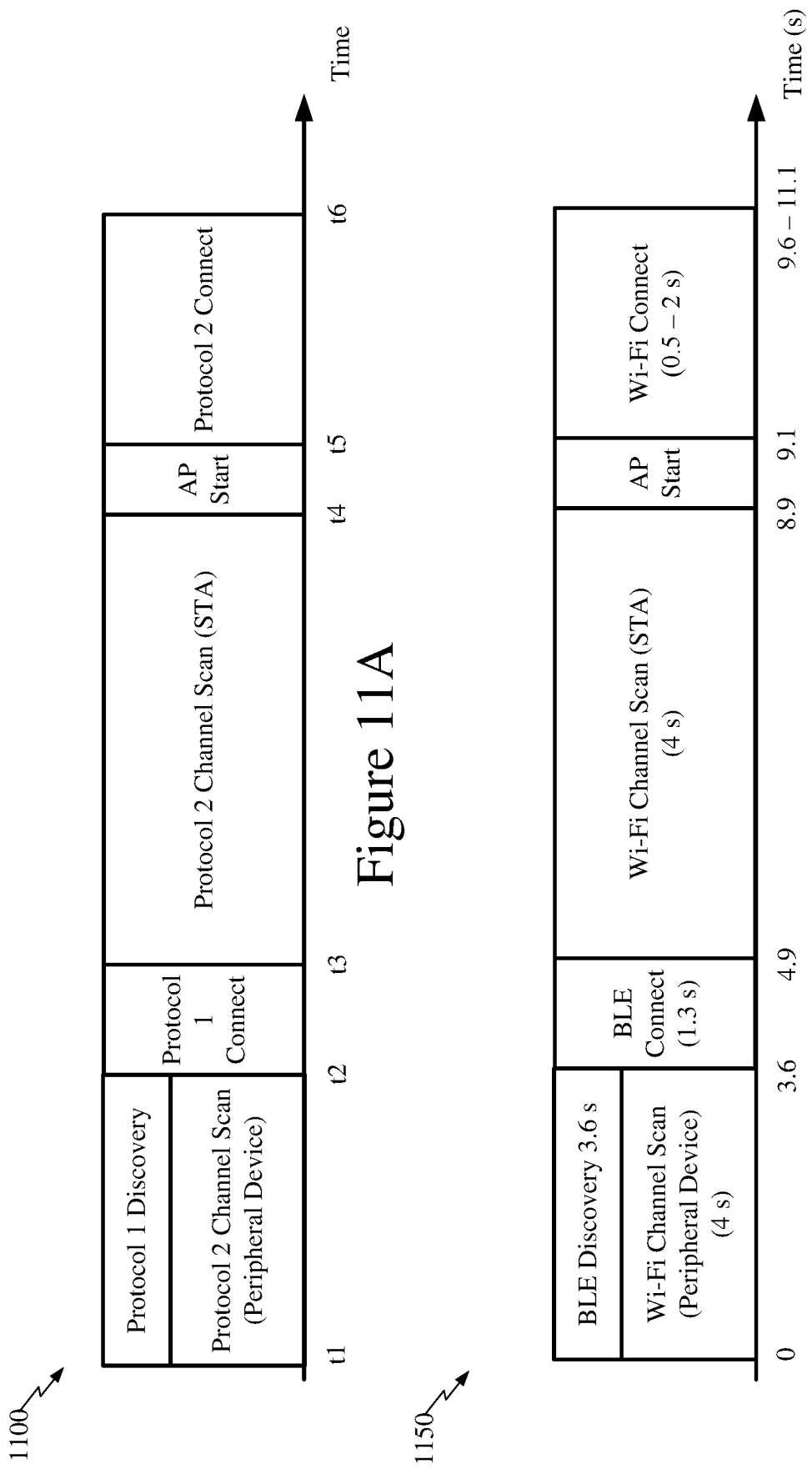
FIG. 11A shows a timing diagram depicting an example process for establishing a wireless link between the STA and the peripheral device of FIG. 10, according to some implementations.
FIG. 11B shows a timing diagram depicting an example process for establishing a wireless link between the STA and the peripheral device of FIG. 10, according to some implementations.

FIG. 11A shows an example timing diagram depicting an example process 1100 for establishing a wireless link between the STA 304 and the peripheral device 306, according to some implementations. The example process 1100 may correspond to the sequence diagram 1000 of FIG. 10. Note that the relative durations of the operations in FIG. 11A are not shown to scale and may vary, due to a number of factors, for example depending on the protocols used for the first connection and the second connection. The STA 304 and the peripheral device 306 may complete Protocol 1 discovery between times t1 and t2. Concurrently with protocol 1 discovery, the peripheral device 306 may perform the first full channel scan associated with the second wireless communication protocol. Note that while FIG. 11A shows these two operations requiring the same amount of time, in some aspects either the protocol 1 discovery or the protocol 2 channel scan may take more time to complete. The STA 304 and the peripheral device 306 may establish the Protocol 1 connection between times t2 and t3. The STA 304 may complete the second full protocol 2 channel scan between times t3 and t4. The STA 304 may start operating as an AP between times t4 and t5. The STA 304 and the peripheral device 306 may establish the second connection may be established between times t5 and t6. Subsequently, the STA 304 may transmit the one or more data streams to the peripheral device 306 via the second connection.

FIG. 11B shows a timing diagram depicting an example process 1150 for establishing a wireless link between the STA 304 and the peripheral device 306, according to some implementations. More specifically, the example process 1150 depicts typical timing of the operations shown in FIG. 10 when BLE and Wi-Fi are the respective first communication protocol and the second wireless communication protocol. Note that the times shown in FIG. 11B correspond to implementations when the STA 304 and the peripheral device 306 each scan all of the wireless channels in the set of wireless channels associated with the full channel scan. The STA 304 and the peripheral device 306 may complete BLE discovery in roughly 3.6 seconds. The peripheral device 306 may complete the first full Wi-Fi channel scan in roughly 4 seconds. The STA 304 and the peripheral device 306 may establish the BLE connection in roughly 1.3 seconds. The STA 304 may complete the second full Wi-Fi channel scan in roughly 4 seconds. The STA 304 may start operating as an AP in roughly 200 ms. Finally, the STA 304 and the peripheral device 306 may establish the second connection according to the Wi-Fi protocol in between 0.5 and 2 seconds. Thus, the operations shown in FIG. 11B for establishing the first connection and the second connection may take approximately 9.6-11.1 seconds when each of the STA 304 and the peripheral device 306 perform a full channel scan. While this does not result in time savings, each of the STA 304 and the peripheral device 306 performing the full channel scan may result in selection of a better channel in the presence of interference or congestion at one or both of the STA 304 and the peripheral device 306.

Figure 12:
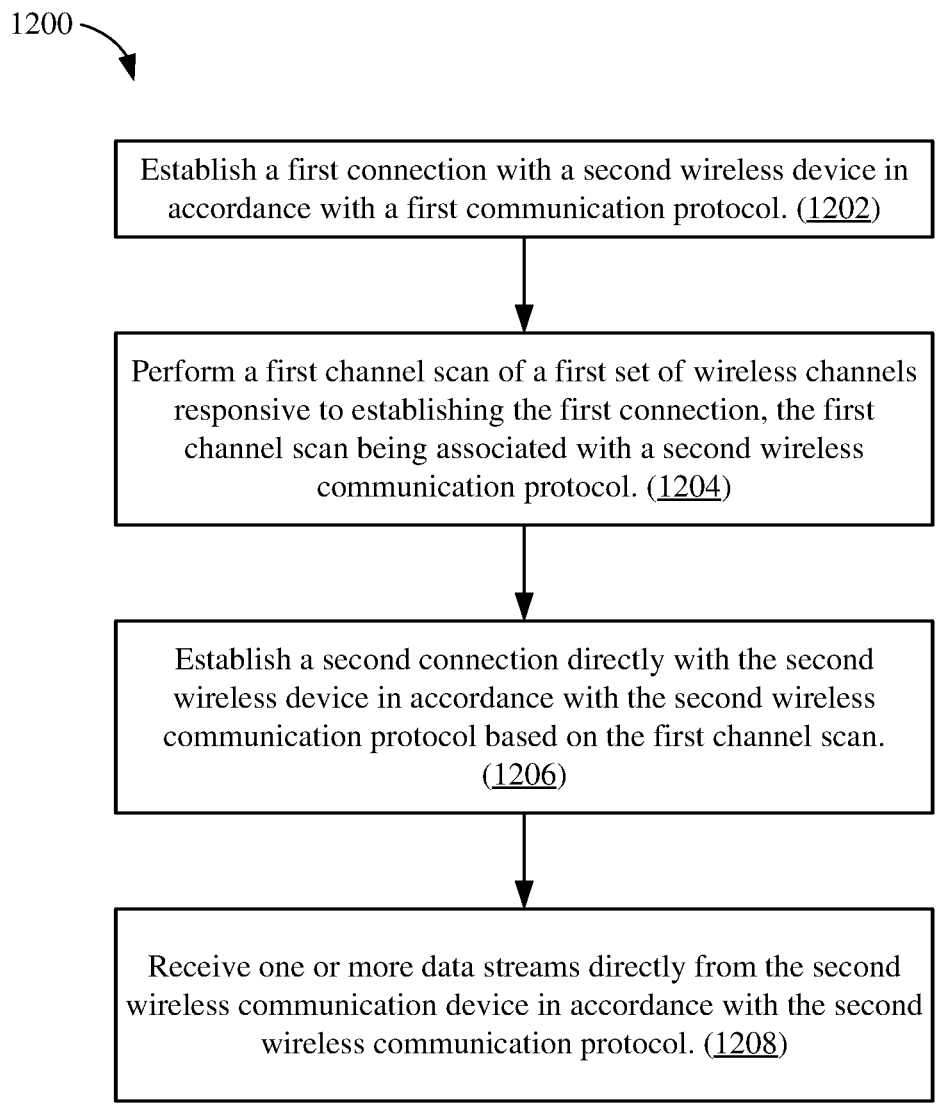
FIG. 12 shows a flowchart illustrating an example process that supports establishing a wireless link between a STA and a peripheral device, according to some implementations.

FIG. 12 shows a flowchart illustrating an example process 1200 that supports establishing a wireless link between a STA 304 and a peripheral device 306, according to some implementations. The process 1200 may be performed by a first wireless communication device such as the wireless communication device 200 described above with respect to FIG. 2. In some implementations, the process 1200 may be performed by a wireless communication device operating as or within a peripheral device, such as the peripheral device 306 of FIG. 3C.

In some implementations, in block 1202, the first wireless communication device establishes a first connection with a second wireless device in accordance with a first communication protocol. In some aspects, the second wireless communication device may be the STA 304 of FIG. 3B.

In some implementations, in block 1204, the first wireless communication device performs a first channel scan of a first set of wireless channels responsive to establishing the first connection, where the first channel scan is associated with a second wireless communication protocol.

In some implementations, in block 1206, the first wireless communication device establishes a second connection directly with the second wireless device in accordance with the second wireless communication protocol based on the first channel scan.

In some implementations, in block 1208, the first wireless communication device receives one or more data streams directly from the second wireless communication device in accordance with the second wireless communication protocol.

In some aspects, the first communication protocol is a relatively shorter range wireless protocol than the second wireless communication protocol. In some aspects the first communication protocol is a Bluetooth protocol, a Bluetooth Low Energy (BLE) protocol, or a near field communications (NFC) protocol.

In some implementations, the process 1200 further includes transmitting a result of the first channel scan to the second wireless communication device in accordance with the first communication protocol.

In some implementations, establishing the second connection in block 1206 is further based on a second channel scan performed by the second wireless communication device, where the second channel scan is associated with a second set of wireless channels. In some aspects, the first set of wireless channels is the same as the second set of wireless channels. In some other aspects, no channels in the first set of wireless channels are in the second set of wireless channels.

Figure 13:
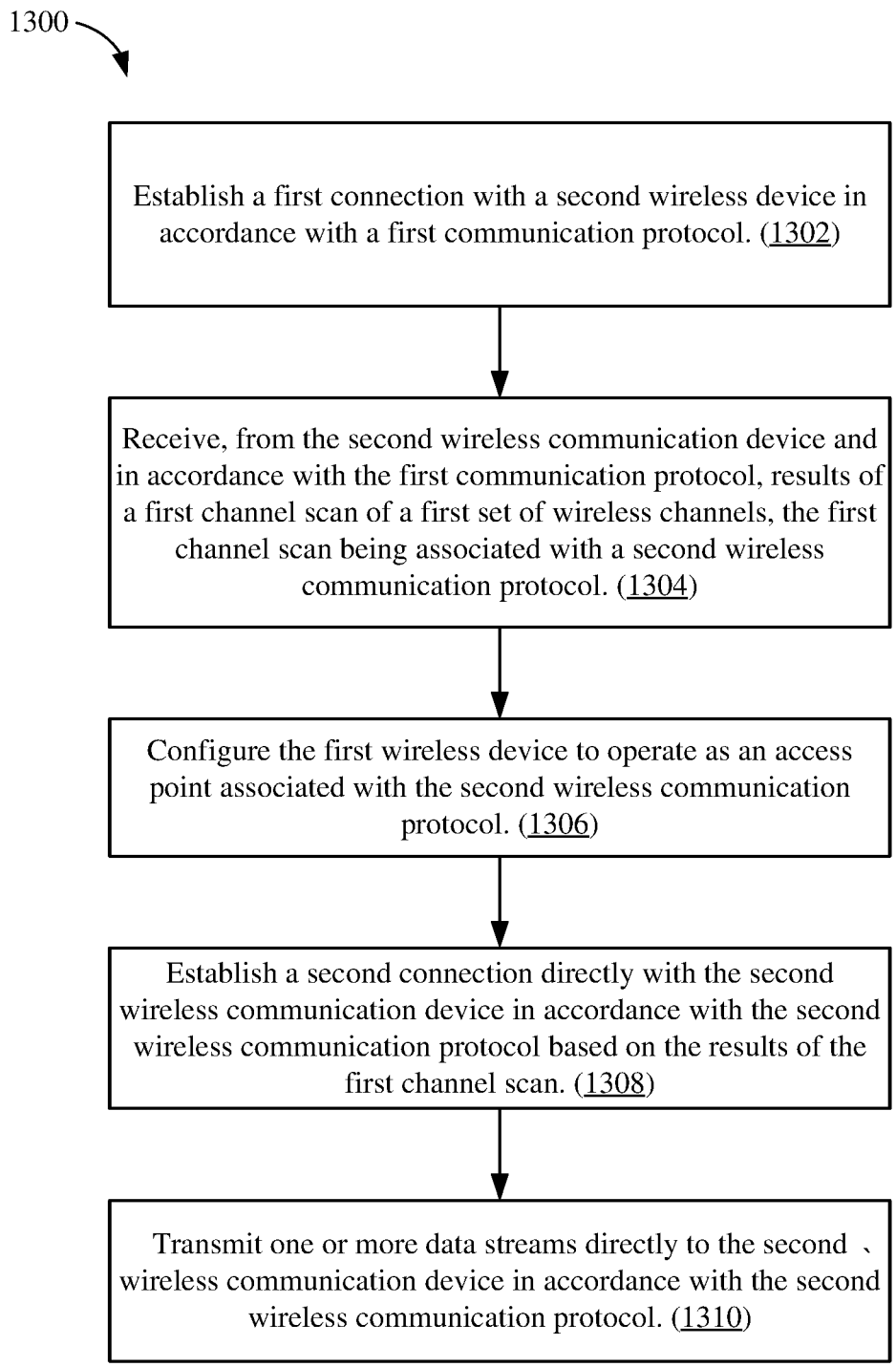
FIG. 13 shows a flowchart illustrating an example process that supports establishing a wireless link between a STA and a peripheral device, according to some implementations.

FIG. 13 shows a flowchart illustrating an example process 1300 that supports establishing a wireless link between a STA 304 and a peripheral device 306, according to some implementations. The process 1300 may be performed by a first wireless communication device such as the wireless communication device 200 described above with respect to FIG. 2. In some implementations, the process 1300 may be performed by a wireless communication device operating as or within a STA, such as the STA 304 of FIG. 3B.

In some implementations, in block 1302, the first wireless communication device establishes a first connection with a second wireless communication device in accordance with a first communication protocol. In some aspects, the second wireless communication device may be the peripheral device 306 of FIG. 3C.

In some implementations, in block 1304, the first wireless communication device receives, from the second wireless communication device and in accordance with the first communication protocol, results of a first channel scan of a first set of wireless channels, where the first channel scan is associated with a second wireless communication protocol.

In some implementations, in block 1306, the first wireless communication device is configured to operate as an access point associated with the second wireless communication protocol.

In some implementations, in block 1308, the first wireless communication device establishes a second connection directly with the second wireless communication device in accordance with the second wireless communication protocol based on the results of the first channel scan.

In some implementations, in block 1310, the first wireless communication device transmits one or more data streams directly to the second wireless communication device in accordance with the second wireless communication protocol.

In some aspects, the first communication protocol is a relatively shorter range wireless protocol than the second wireless communication protocol. In some aspects the first communication protocol is a Bluetooth protocol, a Bluetooth Low Energy (BLE) protocol, or a near field communications (NFC) protocol.

In some aspects the process 1300 further includes performing a second channel scan of a second set of wireless channels, where establishing the second connection is further based on the second channel scan. In some aspects, the first set of wireless channels is the same as the second set of wireless channels. In some other aspects, no channels in the first set of wireless channels are in the second set of wireless channels.

Figure 14:
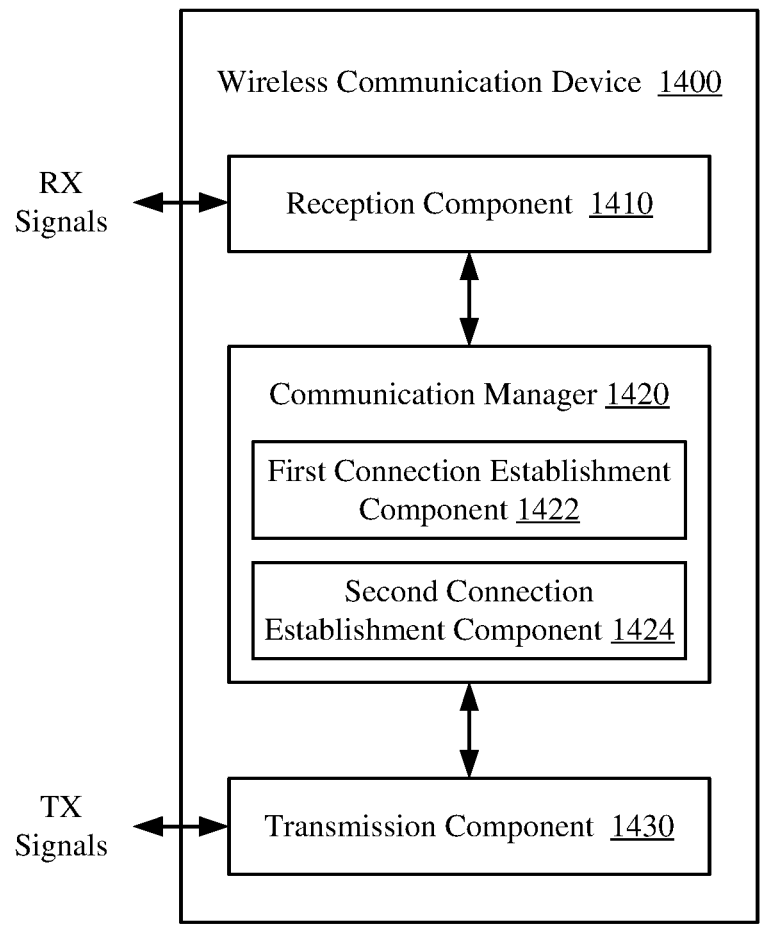
FIG. 14 shows a block diagram of an example wireless communication device that supports establishing a wireless link between a STA and a peripheral device, according to some implementations.

FIG. 14 shows a block diagram of an example wireless communication device 1400 that supports establishing a wireless link between a STA 304 and a peripheral device 306, according to some implementations. In some implementations, the wireless communication device 1400 is configured to perform one or more of the processes 1200 and 1300 described above with reference to FIGS. 12 and 13, respectively. The wireless communication device 1400 may be an example implementation of the wireless communication device 200 described above with reference to FIG. 2. For example, the wireless communication device 1400 can be a chip, SoC, chipset, package or device that includes at least one processor (such as the processor 202), at least one modem (for example, a Wi-Fi (IEEE 802.11) modem or a cellular modem such as the modem 204), at least one memory (such as the memory 208), and at least one radio (such as the radio 206). In some implementations, the wireless communication device 1400 can be a device for use in a peripheral device, such as peripheral device 306 described above with reference to FIG. 3C. In some other implementations, the wireless communication device 1400 can be a peripheral device that includes such a chip, SoC, chipset, package, or device as well as at least one antenna (such as the antennas 327).

The wireless communication device 1400 includes a reception component 1410, a communication manager 1420, and a transmission component 1430. The communication manager 1420 further includes a first connection establishment component 1422 and a second connection establishment component 1424. Portions of one or more of the components 1422 and 1424 may be implemented at least in part in hardware or firmware. In some implementations, at least some of the components 1422 and 1424 are implemented at least in part as software stored in a memory (such as the memory 208. For example, portions of one or more of the components 1422 and 1424 can be implemented as non-transitory instructions (or "code") executable by a processor (such as the processor 202) to perform the functions or operations of the respective module.

The reception component 1410 is configured to receive RX signals over a wireless channels from one or more wireless communication devices. In some implementations, the reception component 1410 may receive RX signals in accordance to at least a first communication protocol and a second wireless communication protocol. The communication manager 1420 is configured to establish connections with one or more wireless communication devices in accordance with at least the first communication protocol and the second wireless communication protocol. In some implementations, the first connection establishment component 1422 may establish a first connection with one or more wireless communication devices in accordance with the first communication protocol. In some implementations, the second connection establishment component 1424 may establish a second connection directly with one or more wireless communication devices in accordance with the second wireless communication protocol and may perform one or more wireless scanning operations associated with the second wireless communication protocol. The transmission component 1430 is configured to transmit TX signals, over a wired or wireless channel, to one or more other wireless communication devices.

Figure 15:
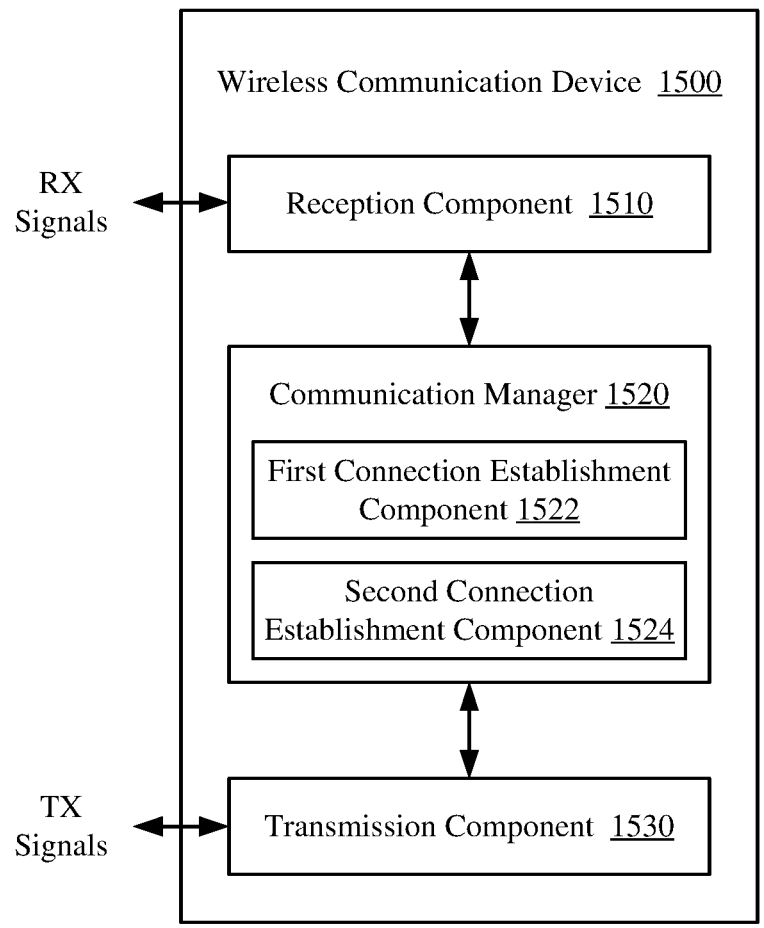
FIG. 15 shows a block diagram of an example wireless communication device that supports establishing a wireless link between a STA and a peripheral device, according to some implementations.

FIG. 15 shows a block diagram of an example wireless communication device 1500 that supports establishing a wireless link between a STA 304 and a peripheral device 306, according to some implementations. In some implementations, the wireless communication device 1500 is configured to perform one or more of the processes 1200 and 1300 described above with reference to FIGS. 12 and 13, respectively. The wireless communication device 1500 may be an example implementation of the wireless communication device 200 described above with reference to FIG. 2. For example, the wireless communication device 1500 can be a chip, SoC, chipset, package or device that includes at least one processor (such as the processor 202), at least one modem (for example, a Wi-Fi (IEEE 802.11) modem or a cellular modem such as the modem 204), at least one memory (such as the memory 208), and at least one radio (such as the radio 206). In some implementations, the wireless communication device 1500 can be a device for use in a STA, such as one of the STAs 104 and 304 described above with reference to FIGS. 1 and 3B, respectively. In some other implementations, the wireless communication device 1500 can be a peripheral device that includes such a chip, SoC, chipset, package, or device as well as at least one antenna (such as the antennas 327).

The wireless communication device 1500 includes a reception component 1510, a communication manager 1520, and a transmission component 1530. The communication manager 1520 further includes a first connection establishment component 1522 and a second connection establishment component 1524. Portions of one or more of the components 1522 and 1524 may be implemented at least in part in hardware or firmware. In some implementations, at least some of the components 1522 and 1524 are implemented at least in part as software stored in a memory (such as the memory 208. For example, portions of one or more of the components 1522 and 1524 can be implemented as non-transitory instructions (or "code") executable by a processor (such as the processor 202) to perform the functions or operations of the respective module.

The reception component 1510 is configured to receive RX signals over a wireless channels from one or more wireless communication devices. In some implementations, the reception component 1510 may receive RX signals in accordance to at least a first communication protocol and a second wireless communication protocol. The communication manager 1520 is configured to establish connections with one or more wireless communication devices in accordance with at least the first communication protocol and the second wireless communication protocol. In some implementations, the first connection establishment component 1522 may establish a first connection with one or more wireless communication devices in accordance with the first communication protocol. In some implementations, the second connection establishment component 1524 may establish a second connection directly with one or more wireless communication devices in accordance with the second wireless communication protocol, may operate as a SoftAP associated with the second wireless communication protocol, and may perform one or more wireless scanning operations associated with the second wireless communication protocol. The transmission component 1530 is configured to transmit TX signals, over a wired or wireless channel, to one or more other wireless communication devices.

Implementation examples are described in the following numbered clauses:

1. A method for wireless communication by a first wireless communication device, including:
   establishing a first connection with a second wireless communication device in accordance with a first communication protocol;
   performing a first channel scan of a first set of wireless channels responsive to establishing the first connection, the first channel scan being associated with a second wireless communication protocol;
   establishing a second connection directly with the second wireless communication device in accordance with the second wireless communication protocol based on the first channel scan; and
   receiving one or more data streams directly from the second wireless communication device in accordance with the second wireless communication protocol.

2. The method of clause 1, wherein the second connection is established based further on a second channel scan performed by the second wireless communication device, the second channel scan being associated with a second set of wireless channels.

3. The method of clause 2, wherein the first set of wireless channels is the same as the second set of wireless channels.

4. The method of clause 2, wherein the first set of wireless channels and the second set of wireless channels do not share any wireless channels.

5. The method of any of clauses 1-4, further including:
   transmitting a result of the first channel scan to the second wireless communication device in accordance with the first communication protocol.

6. The method of any of clauses 1-5, wherein the first communication protocol is a relatively shorter range wireless protocol than the second wireless communication protocol.

7. The method of clause 6, wherein the first communication protocol is a Bluetooth protocol, a Bluetooth Low Energy (BLE) protocol, or a near field communications (NFC) protocol.

8. The method of any of clauses 1-7, wherein the second wireless communication protocol is a wireless communication protocol in accordance with the Institute of Electrical and Electronics Engineers (IEEE) 802.11 family of standards.

9. A first wireless communication device, including:
at least one processor; and
at least one memory communicatively coupled with the at least one processor and storing processor-readable code that, when executed by the at least one processor, is configured to:
establish a first connection with a second wireless communication device in accordance with a first communication protocol;
perform a first channel scan of a first set of wireless channels responsive to establishing the first connection, the first channel scan being associated with a second wireless communication protocol;
establish a second connection with the second wireless communication device in accordance directly with the second wireless communication protocol based on the first channel scan; and
receive one or more data streams directly from the second wireless communication device in accordance with the second wireless communication protocol.

10. The first wireless communication device of clause 9, wherein the second connection is established based on a second channel scan performed by the second wireless communication device, the second channel scan being associated with a second set of wireless channels.

11. The first wireless communication device of clause 10, wherein the first set of wireless channels is the same as the second set of wireless channels.

12. The first wireless communication device of clause 10, wherein no wireless channels in the first set of wireless channels are in the second set of wireless channels.

13. The first wireless communication device of any of clauses 9-12, wherein execution of the processor-readable code causes the first wireless communication device to perform operations further including transmitting a result of the first channel scan to the second wireless communication device in accordance with the first communication protocol.

14. The first wireless communication device of any of clauses 9-13, wherein the first communication protocol is a relatively shorter range wireless protocol than the second wireless communication protocol.

15. The first wireless communication device of clause 14, wherein the first communication protocol is a Bluetooth protocol, a Bluetooth Low Energy (BLE) protocol, or a near field communications (NFC) protocol.

16. The first wireless communication device of any of clauses 9-15, wherein the second wireless communication protocol is a wireless communication protocol in accordance with the Institute of Electrical and Electronics Engineers (IEEE) 802.11 family of standards.

17. A method for wireless communication by a first wireless communication device, including:
establishing a first connection with a second wireless communication device in accordance with a first communication protocol;
receiving, from the second wireless communication device and in accordance with the first communication protocol, results of a first channel scan of a first set of wireless channels, the first channel scan being associated with a second wireless communication protocol;
configuring the first wireless communication device to operate as an access point associated with the second wireless communication protocol;
establishing a second connection directly with the second wireless communication device in accordance with the second wireless communication protocol based on the results of the first channel scan; and
transmitting one or more data streams directly to the second wireless communication device in accordance with the second wireless communication protocol.

18. The method of clause 17, further including:
performing a second channel scan of a second set of wireless channels;
wherein establishing the second connection is further based on the second channel scan.

19. The method of clause 18, wherein the first set of wireless channels is the same as the second set of wireless channels.

20. The method of clause 18, wherein no wireless channels in the first set of wireless channels are in the second set of wireless channels.

21. The method of any of clauses 17-20, wherein the first communication protocol is a relatively shorter range wireless protocol than the second wireless communication protocol.

22. The method of clause 21, wherein the first communication protocol is a Bluetooth Low Energy (BLE) protocol, a Bluetooth protocol, or a near field communications (NFC) protocol.

23. The method of any of clauses 17-22, wherein the second wireless communication protocol is a wireless communication protocol in accordance with the Institute of Electrical and Electronics Engineers (IEEE) 802.11 family of standards.

24. A first wireless communication device, including:
at least one processor; and
at least one memory communicatively coupled with the at least one processor and storing processor-readable code that, when executed by the at least one processor, is configured to:
establish a first connection with a second wireless communication device in accordance with a first communication protocol;
receive, from the second wireless communication device and in accordance with the first communication protocol, results of a first channel scan of a first set of wireless channels, the first channel scan being associated with a second wireless communication protocol;
configure the first wireless communication device to operate as an access point associated with the second wireless communication protocol;
establish a second connection directly with the second wireless communication device in accordance with the second wireless communication protocol based on the results of the first channel scan; and
transmit one or more data streams directly to the second wireless communication device in accordance with the second wireless communication protocol.

25. The first wireless communication device of clause 24, wherein execution of the processor-readable code further causes the first wireless communication device to perform a second channel scan of a second set of wireless channels, wherein establishing the second connection is further based on the second channel scan.

26. The first wireless communication device of clause 25, wherein the first set of wireless channels is the same as the second set of wireless channels.

27. The first wireless communication device of clause 25, wherein no wireless channels in the first set of wireless channels are in the second set of wireless channels.

28. The first wireless communication device of any of clauses 24-27, wherein the first communication protocol is a relatively shorter range wireless protocol than the second wireless communication protocol.

29. The first wireless communication device of clause 28, wherein the first communication protocol is a Bluetooth Low Energy (BLE) protocol, a Bluetooth protocol, or a near field communications (NFC) protocol.

30. The first wireless communication device of any of clauses 24-29, wherein the second wireless communication protocol is a wireless communication protocol in accordance with the Institute of Electrical and Electronics Engineers (IEEE) 802.11 family of standards.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a peripheral wireless communication device, comprising:
   establishing a first connection with a wireless station in accordance with a first wireless communication protocol;
   transmitting, to the wireless station, results of a first channel scan of a first set of wireless channels in accordance with establishing the first connection, the results of the first channel scan indicating one or more wireless channels from the first set of wireless channels for a second wireless communication protocol and indicating one or more received signal strength indicators (RSSIs), one or more noise floors, one or more channel occupancy times, or any combination thereof associated with the one or more wireless channels;
   establishing, in accordance with the second wireless communication protocol and in accordance with a second channel scan performed by the wireless station, a second connection directly with the wireless station using at least one wireless channel of the one or more wireless channels in accordance with the one or more RSSIs, the one or more noise floors, the one or more channel occupancy times, or any combination thereof associated with the one or more wireless channels, wherein the second channel scan is associated with a second set of wireless channels, and wherein the second connection is established using the at least one wireless channel in accordance with the results of the first channel scan at the peripheral wireless communication device and the second set of wireless channels associated with the second channel scan performed by the wireless station; and
   receiving one or more data streams directly from the wireless station in accordance with the second wireless communication protocol.

2. The method of claim 1, wherein the first set of wireless channels and the second set of wireless channels are a same set of wireless channels.

3. The method of claim 1, wherein each respective wireless channel in the first set of wireless channels is different from each respective wireless channel in the second set of wireless channels, and wherein the second connection is established using the at least one wireless channel in accordance with a ranking between the at least one wireless channel and the second set of wireless channels.

4. The method of claim 1, wherein the first wireless communication protocol is a relatively shorter range wireless protocol than the second wireless communication protocol.

5. The method of claim 4, wherein the first wireless communication protocol is a Bluetooth protocol, a Bluetooth Low Energy (BLE) protocol, or a near field communications (NFC) protocol.

6. The method of claim 1, wherein the second wireless communication protocol is a wireless communication protocol in accordance with the Institute of Electrical and Electronics Engineers (IEEE) 802.11 family of standards.

7. A peripheral wireless communication device, comprising:
- at least one processor; and
- at least one memory communicatively coupled with the at least one processor and storing processor-readable code that, when executed by the at least one processor, is configured to cause the peripheral wireless communication device to:
  - establish a first connection with a wireless station in accordance with a first wireless communication protocol;
  - transmit, to the wireless station, results of a first channel scan of a first set of wireless channels in accordance with establishing the first connection, the results of the first channel scan indicating one or more wireless channels from the first set of wireless channels for a second wireless communication protocol and indicating one or more received signal strength indicators (RSSIs), one or more noise floors, one or more channel occupancy times, or any combination thereof associated with the one or more wireless channels;
  - establish, in accordance with the second wireless communication protocol and in accordance with a second channel scan performed by the wireless station, a second connection directly with the wireless station using at least one wireless channel of the one or more wireless channels in accordance with the one or more RSSIs, the one or more noise floors, the one or more channel occupancy times, or any combination thereof associated with the one or more wireless channels, wherein the second channel scan is associated with a second set of wireless channels, and wherein the second connection is established using the at least one wireless channel in accordance with the results of the first channel scan at the peripheral wireless communication device and the second set of wireless channels associated with the second channel scan performed by the wireless station; and
  - receive one or more data streams directly from the wireless station in accordance with the second wireless communication protocol.

8. The peripheral wireless communication device of claim 7, wherein the first set of wireless channels and the second set of wireless channels are a same set of wireless channels.

9. The peripheral wireless communication device of claim 7, wherein each respective wireless channel in the first set of wireless channels is different from each respective wireless channel in the second set of wireless channels, and wherein the second connection is established using the at least one wireless channel in accordance with a ranking between the at least one wireless channel and the second set of wireless channels.

10. The peripheral wireless communication device of claim 7, wherein the first wireless communication protocol is a relatively shorter range wireless protocol than the second wireless communication protocol.

11. The peripheral wireless communication device of claim 10, wherein the first wireless communication protocol is a Bluetooth protocol, a Bluetooth Low Energy (BLE) protocol, or a near field communications (NFC) protocol.

12. The peripheral wireless communication device of claim 7, wherein the second wireless communication protocol is a wireless communication protocol in accordance with the Institute of Electrical and Electronics Engineers (IEEE) 802.11 family of standards.

13. A method for wireless communication by a wireless station, comprising:
- establishing a first connection with a peripheral wireless communication device in accordance with a first wireless communication protocol;
- receiving, from the peripheral wireless communication device and in accordance with the first wireless communication protocol, results of a first channel scan of a first set of wireless channels, the first channel scan being associated with a second wireless communication protocol, the results of the first channel scan indicating one or more wireless channels from the first set of wireless channels for the second wireless communication protocol and indicating one or more received signal strength indicators (RSSIs), one or more noise floors, one or more channel occupancy times, or any combination thereof associated with the one or more wireless channels;
- performing a second channel scan of a second set of wireless channels;
- configuring the wireless station to operate as an access point associated with the second wireless communication protocol in accordance with receiving the results of the first channel scan indicating the one or more wireless channels;
- establishing, in accordance with the second wireless communication protocol and in accordance with performing the second channel scan, a second connection directly with the peripheral wireless communication device using at least one wireless channel of the one or more wireless channels in accordance with the one or more RSSIs, the one or more noise floors, the one or more channel occupancy times, or any combination thereof associated with the one or more wireless channels, wherein the second connection is established using the at least one wireless channel in accordance with the results of the first channel scan from the peripheral wireless communication device and the second set of wireless channels associated with the second channel scan performed by the wireless station; and
- transmitting one or more data streams directly to the peripheral wireless communication device in accordance with the second wireless communication protocol.

14. The method of claim 13, wherein the first set of wireless channels and the second set of wireless channels are a same set of wireless channels.

15. The method of claim 13, wherein each respective wireless channel in the first set of wireless channels is different from each respective wireless channel in the second set of wireless channels, and wherein the second connection is established using the at least one wireless channel in accordance with a ranking between the at least one wireless channel and the second set of wireless channels.

16. The method of claim 13, wherein the first wireless communication protocol is a relatively shorter range wireless protocol than the second wireless communication protocol.

17. The method of claim 16, wherein the first wireless communication protocol is a Bluetooth Low Energy (BLE) protocol, a Bluetooth protocol, or a near field communications (NFC) protocol.

18. The method of claim 13, wherein the second wireless communication protocol is a wireless communication protocol in accordance with the Institute of Electrical and Electronics Engineers (IEEE) 802.11 family of standards.

19. A wireless station, comprising:
at least one processor; and
at least one memory communicatively coupled with the at least one processor and storing processor-readable code that, when executed by the at least one processor, is configured to cause the wireless station to:
establish a first connection with a peripheral wireless communication device in accordance with a first wireless communication protocol;
receive, from the peripheral wireless communication device and in accordance with the first wireless communication protocol, results of a first channel scan of a first set of wireless channels, the first channel scan being associated with a second wireless communication protocol, the results of the first channel scan indicating one or more wireless channels from the first set of wireless channels for the second wireless communication protocol and indicating one or more received signal strength indicators (RSSIs), one or more noise floors, one or more channel occupancy times, or any combination thereof associated with the one or more wireless channels;
perform a second channel scan of a second set of wireless channels;
configure the wireless station to operate as an access point associated with the second wireless communication protocol in accordance with receiving the results of the first channel scan indicating the one or more wireless channels;
establish, in accordance with the second wireless communication protocol and in accordance with performing the second channel scan, a second connection directly with the peripheral wireless communication device using at least one wireless channel of the one or more wireless channels in accordance with the one or more RSSIs, the one or more noise floors, the one or more channel occupancy times, or any combination thereof associated with the one or more wireless channels, wherein the second connection is established using the at least one wireless channel in accordance with the results of the first channel scan from the peripheral wireless communication device and the second set of wireless channels associated with the second channel scan performed by the wireless station; and
transmit one or more data streams directly to the peripheral wireless communication device in accordance with the second wireless communication protocol.

20. The wireless station of claim 19, wherein the first set of wireless channels and the second set of wireless channels are a same set of wireless channels.

21. The wireless station of claim 19, wherein each respective wireless channel in the first set of wireless channels is different from each respective wireless channel in the second set of wireless channels, and wherein the second connection is established using the at least one wireless channel in accordance with a ranking between the at least one wireless channel and the second set of wireless channels.

22. The wireless station of claim 19, wherein the first wireless communication protocol is a relatively shorter range wireless protocol than the second wireless communication protocol.

23. The wireless station of claim 22, wherein the first wireless communication protocol is a Bluetooth Low Energy (BLE) protocol, a Bluetooth protocol, or a near field communications (NFC) protocol.

24. The wireless station of claim 19, wherein the second wireless communication protocol is a wireless communication protocol in accordance with the Institute of Electrical and Electronics Engineers (IEEE) 802.11 family of standards.

* * * * *